US012219431B2

(12) United States Patent
Dong

(10) Patent No.: US 12,219,431 B2
(45) Date of Patent: Feb. 4, 2025

(54) METHOD AND APPARATUS FOR FINDING WEARABLE DEVICE

(71) Applicant: Honor Device Co., Ltd., Shenzhen (CN)

(72) Inventor: Jiyang Dong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/038,789

(22) PCT Filed: Jan. 29, 2022

(86) PCT No.: PCT/CN2022/075080
§ 371 (c)(1),
(2) Date: May 25, 2023

(87) PCT Pub. No.: WO2022/227767
PCT Pub. Date: Nov. 3, 2022

(65) Prior Publication Data
US 2024/0007826 A1    Jan. 4, 2024

(30) Foreign Application Priority Data
Apr. 25, 2021 (CN) .......................... 202110448810.3

(51) Int. Cl.
*H04W 4/029* (2018.01)
*G06F 3/04817* (2022.01)
(Continued)

(52) U.S. Cl.
CPC ........ *H04W 4/029* (2018.02); *G06F 3/04817* (2013.01); *G06F 3/0482* (2013.01);
(Continued)

(58) Field of Classification Search
CPC .. H04W 4/029; G06F 3/04817; G06F 3/0482; G06F 3/0484; G06F 9/451; G06F 16/29; G06F 1/163; H04R 1/1016; H04R 1/1041
See application file for complete search history.

(56) References Cited

U.S. PATENT DOCUMENTS 9,779,596 B2 * 10/2017 Ingrassia, Jr .......... G08B 21/24
10,210,741 B2    2/2019 Chen et al.
(Continued)

FOREIGN PATENT DOCUMENTS

CN         105046896 A    11/2015
CN         108600539 A     9/2018
(Continued)

OTHER PUBLICATIONS

WIPO English translation of CN 110503800 (Year: 2019).*
(Continued)

*Primary Examiner* — Alvin H Tan
(74) *Attorney, Agent, or Firm* — Leydig, Voit & Mayer, Ltd.

(57) ABSTRACT

Embodiments of this application provide a method and an apparatus for finding a wearable device. The method includes: receiving a first event from the wearable device, where the first event includes a wearing event or a taking-off event; obtaining a first position or a first scenario in response to receiving the first event, where the first position is used to indicate a geographical position of an electronic device or the wearable device, and the first scenario is used to indicate a home state of a user; recording an association relationship between the first event and the first position or the first scenario; displaying a first interface in response to a first user operation on a first application program, where the first interface includes a first option for finding the wearable
(Continued)

device; displaying a second interface in response to a user operation of selecting the first option.

16 Claims, 27 Drawing Sheets

(51) Int. Cl.
| | |
|---|---|
| *G06F 3/0482* | (2013.01) |
| *G06F 3/0484* | (2022.01) |
| *G06F 9/451* | (2018.01) |
| *G06F 16/29* | (2019.01) |
| *H04R 1/10* | (2006.01) |

(52) U.S. Cl.
CPC ............ *G06F 3/0484* (2013.01); *G06F 9/451* (2018.02); *G06F 16/29* (2019.01); *H04R 1/1016* (2013.01); *H04R 1/1041* (2013.01); *H04R 2420/07* (2013.01)

(56) References Cited

U.S. PATENT DOCUMENTS

| | | | | |
|---|---|---|---|---|
| 10,616,762 | B2* | 4/2020 | Kang | G06F 1/3287 |
| 10,771,898 | B2* | 9/2020 | Dusan | H04W 64/006 |
| 11,778,421 | B2* | 10/2023 | De Jong | G06F 3/0383 |
| | | | | 345/168 |
| 11,889,375 | B2* | 1/2024 | Lévêque | G08B 25/10 |
| 2014/0156084 | A1* | 6/2014 | Rahman | G16H 40/67 |
| | | | | 700/275 |
| 2015/0350051 | A1* | 12/2015 | Lincoln | H04L 41/12 |
| | | | | 709/224 |
| 2021/0204094 | A1* | 7/2021 | Chhabra | H04W 4/20 |

FOREIGN PATENT DOCUMENTS

| | | |
|---|---|---|
| CN | 108683799 A | 10/2018 |
| CN | 110503800 A | 11/2019 |
| CN | 111221602 A | 6/2020 |
| CN | 111818165 A | 10/2020 |
| CN | 112672278 A | 4/2021 |
| CN | 110503800 B | 9/2021 |
| WO | 2016058145 A1 | 4/2016 |
| WO | 2016102416 A1 | 6/2016 |

OTHER PUBLICATIONS

Yagi, Takuma et al., "GO-Finder: A Registration-Free Wearable System for Assisting Users in Finding Lost Objects via Hand-Held Object Discovery," 26th International Conference on Intelligent User Interfaces, 11 pages (2021).

* cited by examiner

METHOD AND APPARATUS FOR FINDING WEARABLE DEVICE

CROSS-REFERENCE TO RELATED APPLICATIONS

This application is a national stage of International Application No. PCT/CN2022/075080, filed on Jan. 29, 2022, which claims priority to Chinese Patent Application No. 202110448810.3, filed on Apr. 25, 2021. The disclosures of both of the aforementioned applications are hereby incorporated by reference in their entireties.

TECHNICAL FIELD

This application relates to the field of terminals, and more particularly, to a method and an apparatus for finding a wearable device.

BACKGROUND

A wearable device is a portable device that can be directly worn on a user body, or that can be integrated into a garment or an accessory of a user. The wearable device may include a Bluetooth earphone, a smart band, smart glasses, and other devices. Herein, a Bluetooth earphone (for example, a true wireless stereo (TWS) Bluetooth earphone) is a hands-free earphone to which a Bluetooth technology is applied. Without disturbance from a wire, the user may freely use the TWS Bluetooth earphone in various ways (such as listening to music or making a phone call). The Bluetooth earphone is a useful tool for improving efficiency especially for a mobile businessman.

However, the wearable device (for example, a TWS Bluetooth earphone) not only improves user experience, but also troubles the user because the wearable device is easily lost and difficult to find.

SUMMARY

Embodiments of this application provide a method and an apparatus for finding a wearable device, which can help a user find the wearable device conveniently and quickly, and improve user experience.

According to a first aspect, an embodiment of this application provides a method for finding a wearable device, applied to an electronic device, and the method includes: receiving a first event from the wearable device, where the first event includes a wearing event or a taking-off event; obtaining a first position or a first scenario in response to receiving the first event, where the first position is used to indicate a geographical position of the electronic device or the wearable device, and the first scenario is used to indicate a home state of a user; recording an association relationship between the first event and the first position or the first scenario; displaying a first interface in response to a first user operation on a first application program, where the first interface includes a first option for finding the wearable device; displaying a second interface in response to a user operation of selecting the first option, where the second interface includes first information and second information that are corresponding to the wearable device, the first information is associated with the second information, the first information corresponds to the first position or the first scenario, and the second information corresponds to the first event.

According to the method provided in the embodiment of this application, the wearing/taking-off state of the wearable device is associated with the geographical position or the life scenario and recorded, so that the user can better recall a position of the lost wearable device, the user can conveniently retrieve the wearable device, and the user experience is improved.

In a possible implementation, when the first information corresponds to the first position, the method further includes: displaying a visualization map in response to a user operation on the first information, where the first position is indicated in the visualization map. In this way, the user can find the first position in the visualization map. If the wearable device in the first position is in the taking-off state and the wearable device is lost, it indicates that the wearable device is likely to be lost in the vicinity of the first position, and the user can search for the wearable device in a small range, thereby helping the user retrieve the wearable device more quickly and more conveniently.

In a possible implementation, the obtaining, by the electronic device, a first position or a first scenario includes: obtaining the first scenario if it is determined that the electronic device is located in a preset residence area; or obtaining the first position if it is determined that the electronic device is located in an area outside the preset residence area. The preset residence area may refer to a residence/home. Because positioning is usually inaccurate indoors, an earphone usage scenario may be recorded based on an indoor scenario mode. In this way, when the wearable device is subsequently lost, the user can quickly and accurately recall a usage place of the wearable device based on the usage scenario of the wearable device, so that the user can retrieve the wearable device conveniently. In an outgoing scenario, the wearable device may be positioned by using a positioning technology (such as a global satellite positioning system (global positioning system, GPS) positioning technology or a BeiDou positioning technology). In this way, when the wearable device is subsequently lost, the user can quickly and accurately recall a usage place of the wearable device based on positioning information of the wearable device, so that the user can retrieve the wearable device conveniently.

In a possible implementation, the obtaining a first scenario includes searching for the first scenario from a second application program. The second application program includes a plurality of scenarios including at least one of a sleep scenario, a get-up scenario, a cinema scenario, a dining scenario, a leisure scenario, a reading scenario, an entertainment scenario, a return home scenario, or a leave home scenario. The first scenario may be one of the plurality of scenarios described above. The second application program may be same as the first application program, and may be, for example, an AI life app. Alternatively, the second application program may be different from the first application program, and this is not limited in this application.

In a possible implementation, the method further includes: determining whether to switch from the first scenario to a second scenario, where the first scenario is different from the second scenario; and recording an association relationship between the first event and the second scenario if it is determined to switch from the first scenario to the second scenario. Considering that the wearable device in the wearing state can experience changes in a plurality of life scenarios, a usage state of the wearable device and a switched-to scenario can be recorded continuously after scenario switching, so that usage of the wearable device can be more accurately recorded.

In a possible implementation, the method further includes the following steps: The electronic device receives a second event. When the first event is a wearing event, the second event is a taking-off event; or when the first event is a taking-off event, the second event is a wearing event. The electronic device obtains a second position or a third scenario. The second position is used to indicate a geographical position of the electronic device or the wearable device. The third scenario is used to indicate a home state of the user. The electronic device records an association relationship between the second event and the second position or the third scenario. Considering that the wearable device can switch between the wearing state and the taking-off state, a usage state (the wearing state or the taking-off state) and a response position or scenario of the wearable device can be recorded continuously after the switching, so that usage of the wearable device can be more accurately recorded to subsequently help the user find the wearable device more conveniently and quickly.

In a possible implementation, the obtaining a first position includes: obtaining the first position from the wearable device, where the first position is used to indicate the geographical position of the wearable device; or obtaining the first position based on a network positioning technology, where the first position is used to indicate the geographical position of the electronic device, and the network positioning technology includes a base station positioning technology, a wireless fidelity (Wi-Fi) positioning technology, and a global satellite positioning system GPS positioning technology. In other words, the geographical position collected by the wearable device may be used as a geographical position in which the user is using the wearable device, or the geographical position collected by the electronic device may be used as a geographical position in which the user is using the wearable device (because the wearable device is usually used in combination with the electronic device, a difference between the geographical position collected by the wearable device and the geographical position collected by the electronic device is relatively small).

In a possible implementation, the first position is indicated by a geographical coordinate of the wearable device or the electronic device, or the first position is indicated by a first name determined from a geographical coordinate of the wearable device or the electronic device. For example, the first name may be a XX cafe, a XX coffeehouse, a XX library, or a XX store in a shopping mall.

In a possible implementation, when the wearable device is a Bluetooth earphone including a left earbud and a right earbud, the second interface includes first information and second information that are corresponding to the left earbud, and first information and second information that are corresponding to the right earbud. For example, as shown in FIG. 10, an interface 730 (second interface) may include first information (such as an icon 737 and an icon 738 that are corresponding to the wearing state, and an icon 739a and an icon 739b that are corresponding to the taking-off state) and second information (such as a scenario card 740, a scenario card 741, and a scenario card 742 that are corresponding to different scenarios) that are corresponding to the left earbud. The interface 730 (second interface) may also include first information (such as an icon 733, an icon 734, and an icon 735 that are corresponding to the wearing state, and an icon 736 corresponding to the taking-off state) and second information (such as a scenario card 740, a scenario card 741, and a scenario card 742 that are corresponding to different scenarios) that are corresponding to the right earbud. The second information corresponding to the left earbud and the second information corresponding to the right earbud may be represented by a same scenario card.

According to a second aspect, an embodiment of this application provides a method for finding a wearable device, applied to an electronic device. The wearable device is a Bluetooth earphone including a left earbud and a right earbud. The method includes: receiving a first event from the left earbud, where the first event includes a wearing event or a taking-off event; obtaining a first position or a first scenario in response to receiving the first event, where the first position is used to indicate a geographical position of the electronic device or the left earbud, and the first scenario is used to indicate a home state of a user; recording an association relationship between the first event and the first position or the first scenario; receiving a second event from the right earbud, where the second event includes a wearing event or a taking-off event; obtaining a second position or a second scenario in response to receiving the second event, where the second position is used to indicate a geographical position of the electronic device or the right earbud, the second scenario is used to indicate a home state of the user; recording an association relationship between the second event and the second position or the second scenario; displaying a first interface in response to a first user operation on a first application program; where the first interface includes an option for finding the left earbud and an option for finding the right earbud; and displaying a second interface in response to a user selection of the option corresponding to the left earbud, where the second interface includes first information and second information that are corresponding to the left earbud, the first information is associated with the second information, the first information corresponds to the first position or the first scenario, and the second information corresponds to the first event; or displaying a third interface in response to a user selection of the option corresponding to the right earbud, where the second interface includes third information and fourth information that are corresponding to the right earbud, the third information is associated with the fourth information, the third information corresponds to the second position or the second scenario, and the fourth information corresponds to the second event.

According to the method provided in the embodiment of this application, the wearing/taking-off state of the earphone (the left earbud or the right earbud) is associated with the geographical position or the life scenario and recorded, so that the user can better recall a position of the lost earphone, the user can conveniently retrieve the wearable device, and user experience is improved.

According to a third aspect, an embodiment of this application provides a method for finding a wearable device, applied to a system including an electronic device and a wearable device. The method includes the following steps: The wearable device sends a first event to the electronic device when the wearable device detects the first event. The electronic device receives the first event from the wearable device, and the first event includes a wearing event or a taking-off event. The electronic device obtains a first position or a first scenario in response to receiving the first event, the first position is used to indicate a geographical position of the electronic device or the wearable device, and the first scenario is used to indicate a home state of a user. The electronic device records an association relationship between the first event and the first position or the first scenario. The electronic device displays a first interface in response to a first user operation of a first application program, and the first interface includes a first option for finding the wearable device. The electronic device displays a second interface in response to a user operation of selecting the first option, the second interface includes first information and second information that are corresponding to the wearable device, the first information is associated with the second information, the first information corresponds to the first position or the first scenario, and the second information corresponds to the first event.

According to the method provided in the embodiment of this application, the wearing/taking-off state of the wearable device is associated with the geographical position or the life scenario and recorded, so that the user can better recall a position of the lost wearable device, the user can conveniently retrieve the wearable device, and the user experience is improved.

According to a fourth aspect, this application provides a chip system including one or more interface circuits and one or more processors. The interface circuit and the processor are interconnected by a wire.

The chip system may be applied to an electronic device including a communications module and a memory. The interface circuit is configured to receive a signal from the memory of the electronic device and send the received signal to the processor. The signal includes computer instructions stored in the memory. When the processor executes the computer instructions, the electronic device may perform the method described in the first aspect or the second aspect or the third aspect or any one of the possible designs thereof.

According to a fifth aspect, this application provides a computer-readable storage medium including computer instructions. When the computer instructions are run on an electronic device (for example, a mobile phone), the electronic device is enabled to perform the method described in the first aspect or the second aspect or the third aspect or any one of the possible designs thereof.

According to a sixth aspect, this application provides a computer program product, and when the computer program product is run on a computer, the computer is enabled to perform the method described in the first aspect or the second aspect or the third aspect or any one of the possible designs thereof.

According to a seventh aspect, an embodiment of this application provides an apparatus for finding a wearable device. The apparatus includes a processor, and the processor is coupled to a memory storing program instructions. When the program instructions stored in the memory are executed by the processor, the apparatus is enabled to implement the method described in the first aspect or the second aspect or the third aspect or any one of the possible designs thereof. The apparatus may be an electronic device; or may be a component, for example, a chip, in an electronic device.

According to an eighth aspect, an embodiment of this application provides an apparatus for finding a wearable device, which may be divided into different logical units or modules based on functions, and each unit or module performs a different function, so that the apparatus performs the method described in the first aspect or the second aspect or the third aspect or any one of the possible designs thereof.

According to a ninth aspect, an embodiment of this application provides a system for finding a wearable device, and the system includes an electronic device and a wearable device. The electronic device and the wearable device perform partial steps separately, to cooperate with each other to implement the method described in the first aspect or the second aspect or the third aspect or any one of the possible designs thereof.

It will be understood that for beneficial effects of the chip system according to the fourth aspect, the computer-readable storage medium according to the fifth aspect, the computer program product according to the sixth aspect, the apparatus according to the seventh aspect, the apparatus according to the eighth aspect, and the system according to the ninth aspect, reference may be made to the beneficial effects according to the first aspect or the second aspect or the third aspect or any one of the possible designs thereof, and details are not described herein again.

DESCRIPTION OF EMBODIMENTS

Figure 1:
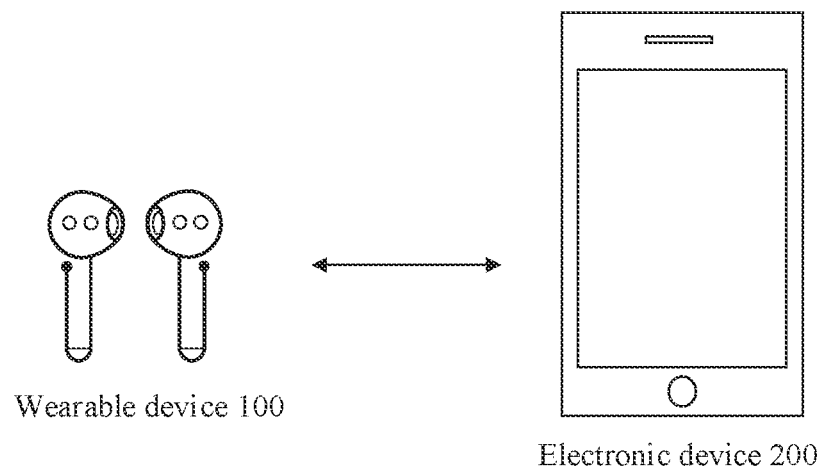
FIG. 1 is a schematic diagram of a system architecture according to an embodiment of this application.

FIG. 1 is a schematic diagram of a communications system architecture according to an embodiment of this application. The communications system architecture may include a wearable device 100 and an electronic device 200. The wearable device 100 and the electronic device 200 may perform Bluetooth communication.

Figure 2:
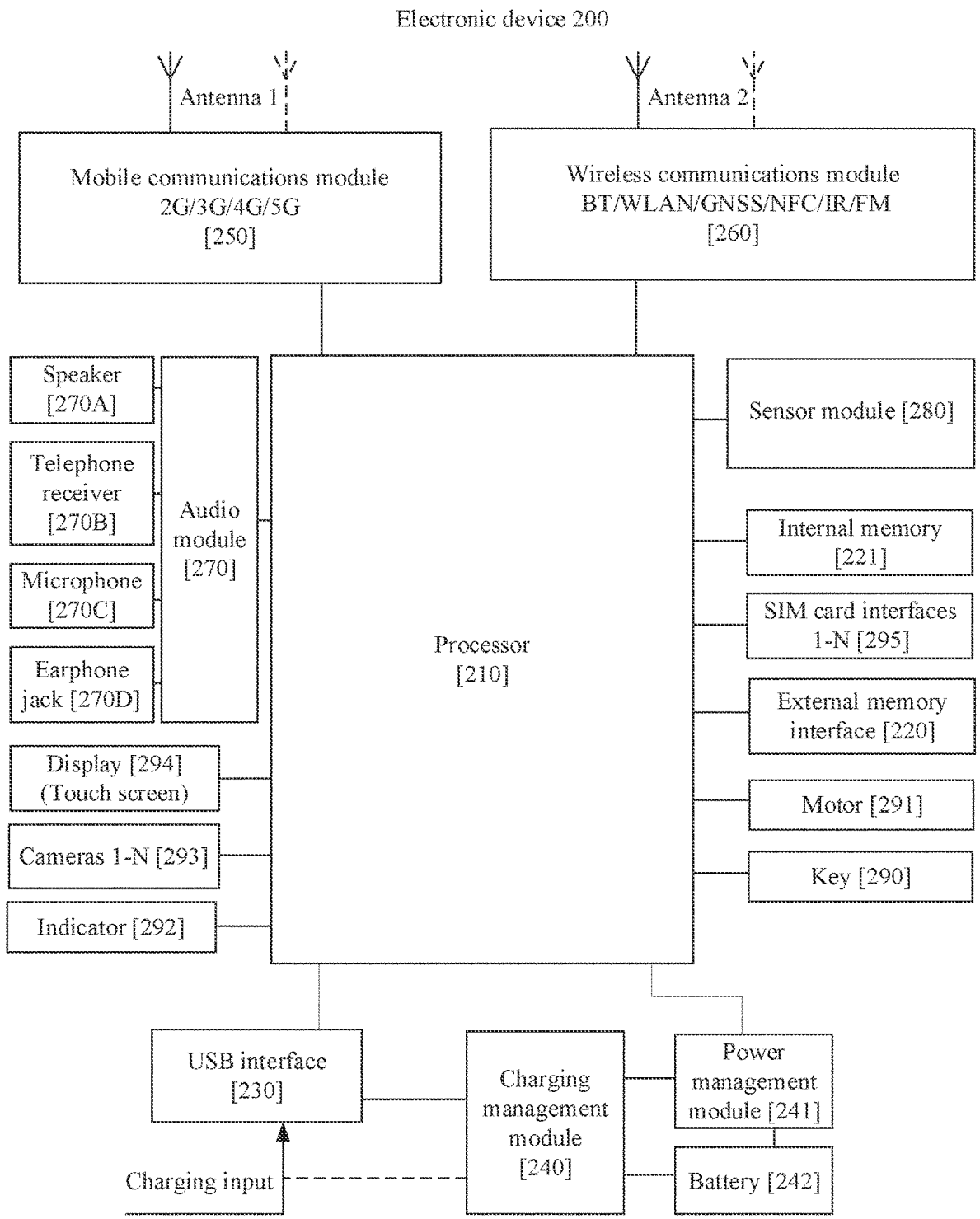
FIG. 2 is a schematic diagram of a hardware structure of an electronic device according to an embodiment of this application.

As shown in FIG. 2, in this embodiment of this application, the electronic device 200 (for example, a mobile phone) is used as an example to illustrate a structure of an electronic device provided in the embodiments of this application. The electronic device 200 (for example, a mobile phone) may include: a processor 210, an external memory interface 220, an internal memory 221, a universal serial bus (USB) interface 230, a charging management module 240, a power management module 241, a battery 242, an antenna 1, an antenna 2, a mobile communications module 250, a wireless communications module 260, an audio module 270, a speaker 270A, a telephone receiver 270B, a microphone 270C, an earphone jack 270D, a sensor module 280, a key 290, a motor 291, an indicator 292, a camera 293, a display 294, a subscriber identity module (SIM) card interface 295, and the like.

The sensor module 280 may include a sensor such as a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, and a bone conduction sensor.

It may be understood that the structure illustrated in this embodiment does not constitute a specific limitation on the electronic device 200. In some other embodiments, the electronic device 200 may include more or fewer components than those shown in the figure, or may combine some components, or may split some components, or may have different component arrangements. The components in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 200. The controller can generate an operation control signal based on instruction operation codes and a timing signal, and complete the control of fetching and executing instructions.

The memory may be further disposed in the processor 210 to store instructions and data. In some embodiments, the memory of the processor 210 is a cache memory. The memory may store instructions or data recently used or repeatedly used by the processor 210. If the processor 210 needs to use the instruction or the data again, the processor 210 may directly invoke the instruction or the data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

It can be understood that the interface connection relationship between the modules illustrated in this embodiment is merely an example for description, and does not constitute a limitation on the structure of the electronic device 200. In some other embodiments, the electronic device 200 may alternatively use an interface connection mode that is different from those in the foregoing embodiments, or use a combination of a plurality of interface connection modes.

The charging management module 240 is configured to receive charging input from a charger. The charger may be a wireless charger, or may be a wired charger. When charging the battery 242, the charging management module 240 can further supply power to the electronic device by using the power management module 241.

The power management module 241 is configured to connect to the battery 242, the charging management module 240, and the processor 210. The power management module 241 receives input of the battery 242 and/or the charging management module 240, and supplies power to the processor 210, the internal memory 221, an external memory, the display 294, the camera 293, the wireless communications module 260, and the like. In some embodiments, the power management module 241 and the charging management module 240 may be alternatively disposed in a same device.

A wireless communications function of the electronic device 200 may be implemented by using the antenna 1, the antenna 2, the mobile communications module 250, the wireless communications module 260, the modem processor, the baseband processor, and the like. In some embodiments, the antenna 1 of the electronic device 200 is coupled to the mobile communications module 250, and the antenna 2 is coupled to the wireless communications module 260, so that the electronic device 200 can communicate with a network and another device by using a wireless communications technology.

The antenna 1 and the antenna 2 are configured to transmit and receive electromagnetic wave signals. Each antenna in the electronic device 200 may be configured to cover one or more communications bands. Different antennas may be further multiplexed to improve antenna utilization. For example, the antenna 1 may be multiplexed as a diversity antenna for a wireless local area network. In some other embodiments, the antenna may be used together with a tuning switch.

The mobile communications module 250 may provide a wireless communications solution including 2G/3G/4G/5G and the like to be applied to the electronic device 200. The mobile communications module 250 may include at least one filter, at least one switch, at least one power amplifier, at least one low noise amplifier (LNA), and the like. The mobile communications module 250 may receive an electromagnetic wave by using the antenna 1, perform processing such as filtering and amplification on the received electromagnetic wave, and send a processed electromagnetic wave to the modem processor for demodulation.

The mobile communications module 250 may further amplify a signal modulated by the modem processor, and convert the signal into an electromagnetic wave for radiation by using the antenna 1. In some embodiments, at least some function modules of the mobile communications module 250 may be disposed in the processor 210. In some embodiments, at least some function modules of the mobile communications module 250 and at least some modules of the processor 210 may be disposed in a same component.

The wireless communications module 260 may provide a wireless communications solution that is applied to the electronic device 200, including a WLAN (such as a (wireless fidelity (Wi-Fi)) network), Bluetooth (BT), a global navigation satellite system (GNSS), frequency modulation (FM), near field communication (NFC), an infrared (IR) technology, and the like.

The GNSS may include the BeiDou navigation satellite system (BDS), the GPS, the global navigation satellite system (GLONASS), the quasi-zenith satellite system (QZSS), and/or satellite based augmentation systems (SBAS).

The wireless communications module 260 may be one or more components into which at least one communications processing module is integrated. The wireless communications module 260 receives an electromagnetic wave by using the antenna 2, performs frequency modulation and filtering processing on the electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation by using the antenna 2.

The electronic device 200 implements a display function by using the GPU, the display 294, the application processor, and the like. The GPU is a microprocessor for image processing, and connects the display 294 and the application processor. The GPU is configured to perform mathematical and geometric calculation for graphics rendering. The processor 210 may include one or more GPUs that execute program instructions to generate or change display information.

The display 294 is configured to display an image, a video, and the like. The display 294 includes a display panel.

The electronic device 200 can implement a photographing function by using the ISP, the camera 293, the video codec, the GPU, the display 294, the application processor, and the like. The ISP is configured to process data fed back by the camera 293. The camera 293 is configured to capture a still image or a video. In some embodiments, the electronic device 200 may include one or N cameras 293, where N is a positive integer greater than 1.

The external memory interface 220 may be configured to connect to an external memory card, for example, a micro SD card, to expand a storage capacity of the electronic device 200. The external memory card communicates with the processor 210 by using the external memory interface 220 to implement a data storage function. For example, files such as music and videos can be stored in the external memory card.

The internal memory 221 may be configured to store computer executable program code, and the executable program code includes instructions. The processor 210 executes various functional applications of the electronic device 200 and data processing by running the instructions stored in the internal memory 221. For example, in this embodiment of this application, the processor 210 can execute instructions stored in the internal memory 221. The internal memory 221 may include a program storage area and a data storage area.

The program storage area may store an operating system, an application required by at least one function (such as a sound playback function or an image display function), or the like. The data storage area may store data (such as audio data and a phone book) created during use of the electronic device 200. In addition, the internal memory 221 may include a high-speed random access memory, and may further include a non-volatile memory, such as at least one magnetic disk storage device, a flash memory device, or a universal flash storage (UFS).

The electronic device 200 can implement audio functions, such as music playing and sound recording, by using the audio module 270, the speaker 270A, the telephone receiver 270B, the microphone 270C, the earphone jack 270D, the application processor, and the like.

The key 290 includes a power-on key, a volume key, or the like. The key 290 may be a mechanical key or may be a touch key. The motor 291 can generate a vibration prompt. The motor 291 may be configured to provide an incoming call vibration prompt, or may be configured to provide a touch vibration feedback. The indicator 292 may be an indicator light, which may be configured to indicate a charging state and a power change, or to indicate a message, a missed call, a notification, or the like. The SIM card interface 295 is configured to connect to a SIM card. The SIM card may be inserted into the SIM card interface 295 or pulled out from the SIM card interface 295, to touch and separate from the electronic device 200. The electronic device 200 can support 1 or N SIM card interfaces, where N is a positive integer greater than 1. The SIM card interface 295 can support a nano SIM card, a micro SIM card, a SIM card, and the like.

It may be understood that the structure illustrated in this embodiment of this application does not constitute a specific limitation on the electronic device 200. In some other embodiments of this application, the electronic device 200 may include more or fewer components than those shown in the figure, or may combine some components, or may split some components, or may have different component arrangements. The components in the figure may be implemented by hardware, software, or a combination of software and hardware.

For example, the electronic device 100 may be a mobile phone, a smart remote control, a palmtop computer, an augmented reality (AR)/virtual reality (VR) device, a portable multimedia player (PMP), a media player, or the like. A specific type of the electronic device is not limited in this embodiment of this application.

Figure 3:
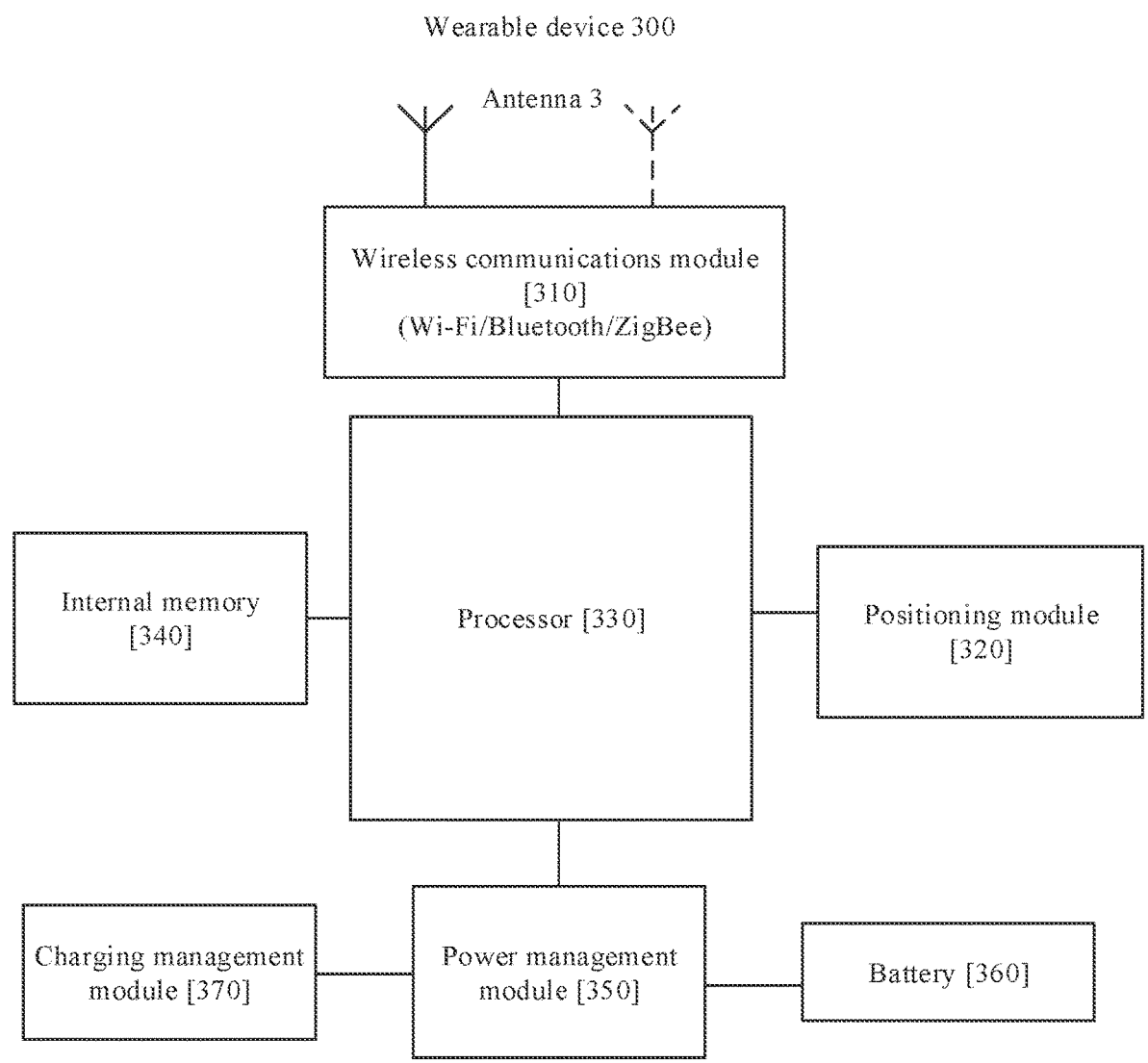
FIG. 3 is a schematic diagram of a hardware structure of a wearable device according to an embodiment of this application.

As shown in FIG. 3, a wearable device 100 may include a wireless communications module 310, a positioning module 320, a processor 330, an internal memory 340, a power management module 350, a battery 360, a charging management module 370, an antenna 3, and the like.

The processor 330 may include one or more processing units. For example, the processor 330 may include an application processor (AP), a modem processor, a graphics processing unit (GPU), an image signal processor (ISP), a controller, a video codec, a digital signal processor (DSP), a baseband processor, a neural-network processing unit (NPU), and/or the like.

In some embodiments, the processor 330 may include one or more interfaces. The interface may include an I2C interface, an I2S interface, a PCM interface, a UART interface, a MIPI, a GPIO interface, a SIM card interface, a USB interface, and/or the like.

It may be understood that the interface connection relationship between the modules illustrated in this embodiment of this application is merely an example for description, and constitutes no limitation on the structure of the wearable device 100. In some other embodiments of this application, the wearable device 100 may alternatively use an interface connection manner different from that in the foregoing embodiment, or a combination of a plurality of interface connection manners.

The charging management module 370 is configured to receive charging input from a charger. The charger may be a wireless charger, or may be a wired charger.

The power management module 350 is configured to connect the battery 360, the charge management module 370, and the processor 330. The power management module 350 receives an input from the battery 360 and/or the charge management module 370, and supplies power to the processor 330, the internal memory 340, an external memory interface 220, the wireless communications module 310, and the like. The power management module 350 may be further configured to monitor parameters such as a battery capacity, a battery cycle count, and a battery health state (leakage and impedance).

A wireless communications function of the wearable device 100 may be implemented by the antenna 3, the wireless communications module 310, the positioning module 320, and the like.

The positioning module 320 may provide a positioning technology applied to the wearable device 100. The positioning technology may include positioning technologies based on the BeiDou navigation satellite system (BDS), the global satellite positioning system (global positioning system, GPS), the global navigation satellite system (GLONASS), the quasi-zenith satellite system (QZSS), satellite based augmentation systems (SBAS), and/or the like.

The positioning module 320 may be integrated into or separated from the wireless communications module 310. This is not limited in this application.

The internal memory 340 may be configured to store one or more computer programs including instructions.

The wearable device 100 may be further provided with an optical sensor (for example, an infrared temperature measurement sensor), a motion sensor (such as an acceleration sensor or a gyroscope), a capacitive sensor, and the like.

When the wearable device is a Bluetooth earphone, based on any one or more of the foregoing sensors, wearing/taking-off check may be performed on the Bluetooth earphone, to determine whether the Bluetooth earphone is in a wearing state or a taking-off (detached) state.

For example, when the Bluetooth earphone is provided with an infrared temperature measurement sensor and an acceleration sensor, the infrared temperature measurement sensor may be used to sense a change in temperature within a preset time and the acceleration sensor may be used to determine whether a wearing action has taken place within the preset time, to determine whether the Bluetooth earphone is in the wearing state or in the taking-off state. For another example, when a capacitive sensor is provided on the Bluetooth earphone, a change in capacitances of the capacitive sensor during wearing and taking off the earphone may be used to determine whether the Bluetooth earphone is in the wearing state or in the taking-off state It should be understood that when the Bluetooth earphone is in the wearing state, the Bluetooth earphone is worn on a user ear. When the Bluetooth earphone is in the taking-off state, the Bluetooth earphone may be stored in the earphone box, may be placed on a table, or may be left on a floor, a sofa, or the like, and this is not limited in this application.

Alternatively, the Bluetooth earphone may also include a speaker and a microphone. The speaker may play audio to the user ear. The microphone may collect audio data such as a speech of a user on an ongoing telephone call and/or ambient noise information (for example, for noise cancellation).

During operation of the Bluetooth earphone, the state of the Bluetooth earphone may be controlled according to a tap operation (such as a single tap, a double tap, or a triple tap) detected by the accelerometer. In response to the operation of controlling the Bluetooth earphone, the Bluetooth earphone may adjust audio playback (for example, may start or stop playing music when a single tap operation is detected). Further, a power management function of the Bluetooth earphone may be controlled in response to the operation of controlling the Bluetooth earphone. For example, when a single tap operation is detected, the playback of music is stopped, and the Bluetooth earphone is set to a low-power sleep mode when the Bluetooth earphone is not used to play music for the user.

It may be understood that the structure illustrated in this embodiment of this application does not constitute any specific limitation on the wearable device 100. In some other embodiments of this application, the wearable device 100 may include more or fewer components than shown in the figure, or may combine some components, or may split some components, or may have different component arrangements. The components in the figure may be implemented by hardware, software, or a combination of software and hardware.

The wearable device 100 may include, for example, a Bluetooth earphone, a smart band, a smart watch, or smart glasses, and this is not limited in this application.

The following describes technical solutions in embodiments of this application with reference to accompanying drawings in the embodiments of this application. In the description of this application, unless otherwise specified, "at least one" means one or more, and "plurality" means two or more. In addition, for ease of clearly describing the technical solutions in the embodiments of this application, in the embodiments of this application, words such as "first" and "second" are used to distinguish same items or similar items whose functions and effects are basically the same. A person skilled in the art may understand that the words such as "first" and "second" do not limit a quantity and an execution order, and the words such as "first" and "second" do not necessarily indicate a difference.

For ease of understanding, a method for finding a wearable device according to the embodiments of this application is described in detail below with reference to the accompanying drawings.

Figure 4A:
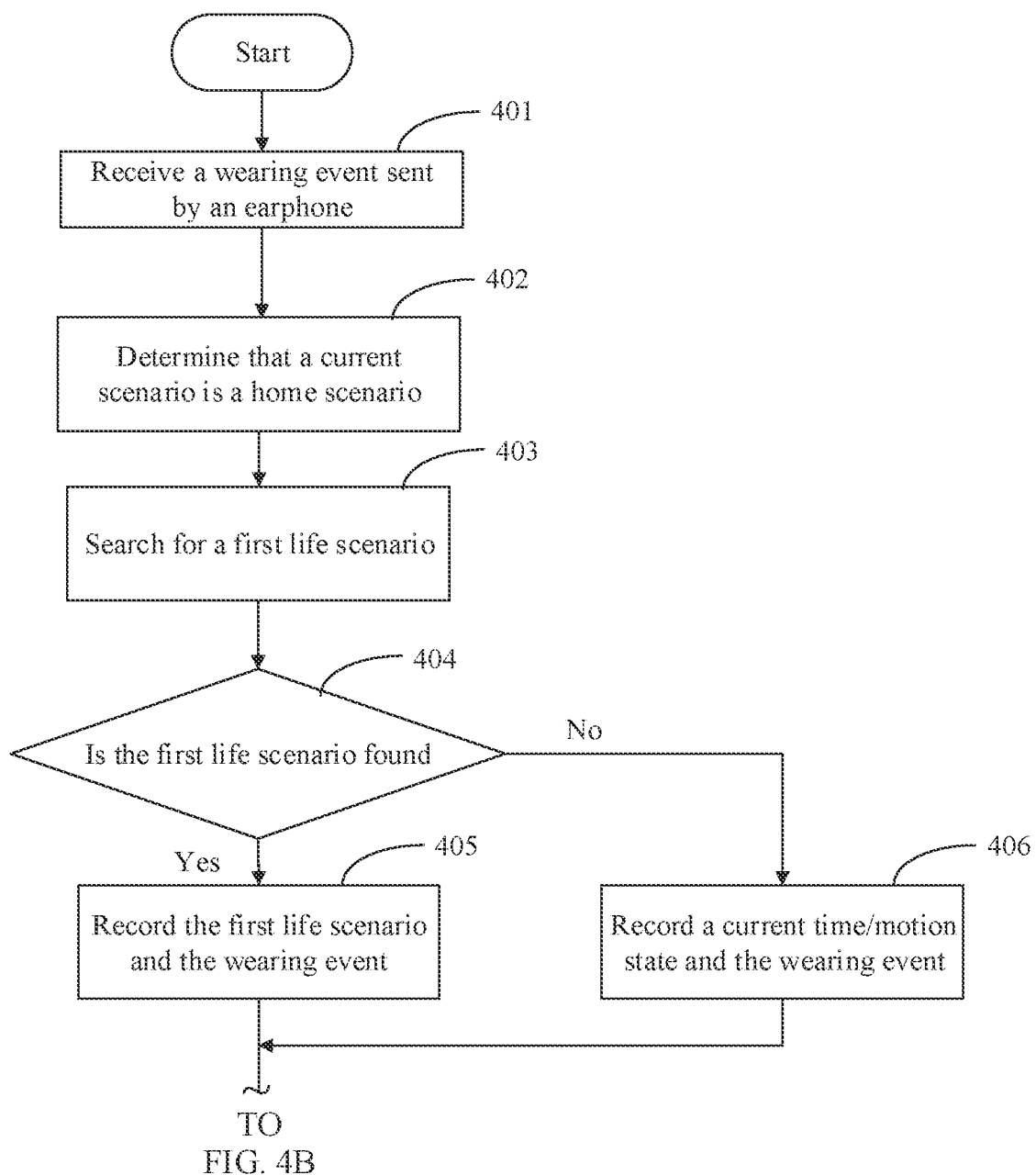
FIG. 4A and FIG. 4B are a flowchart according to an embodiment of this application.
Figure 4B:
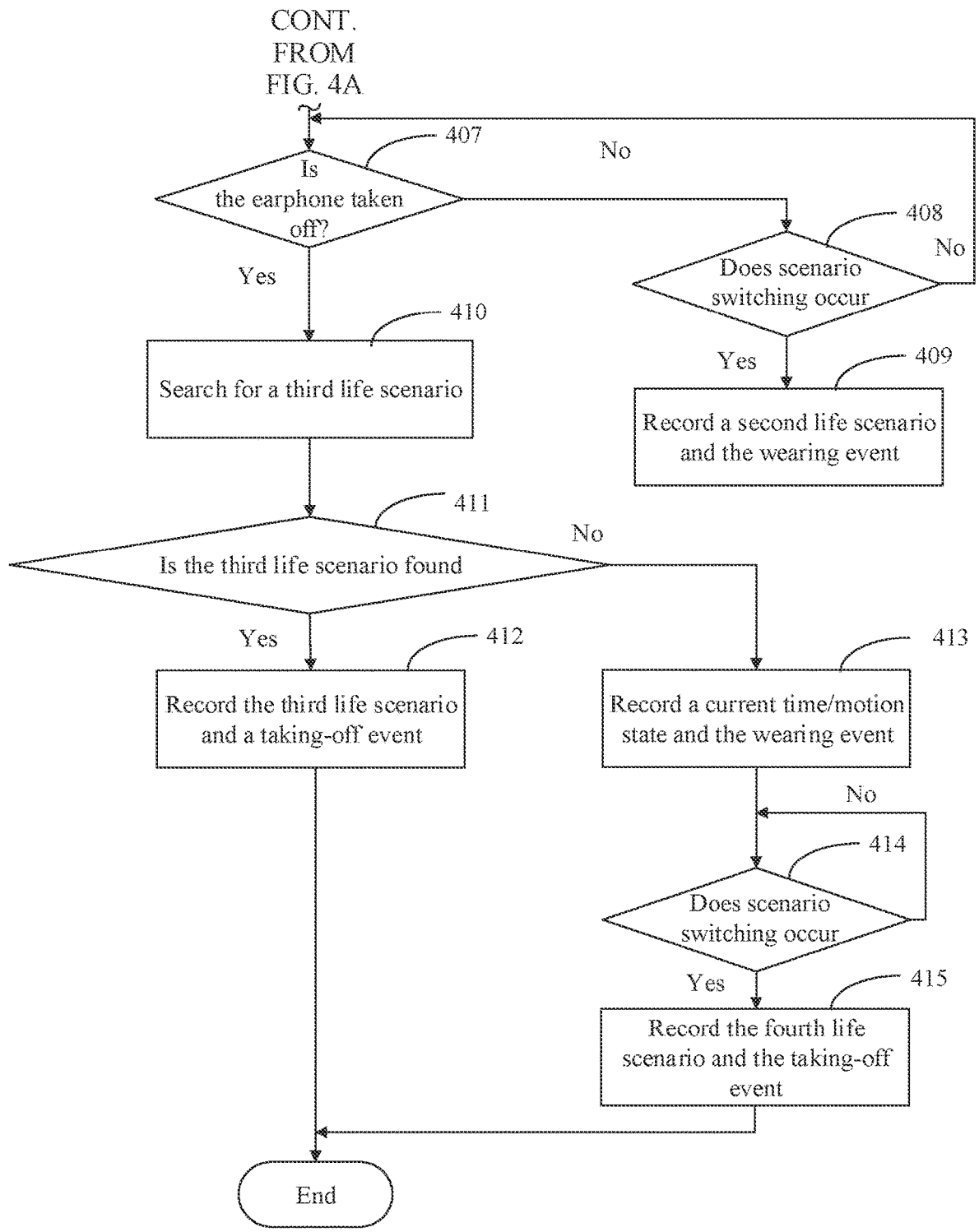

As shown in FIG. 4A and FIG. 4B, an embodiment of this application provides a method for finding a wearable device. The method is described by taking an example in which the wearable device is an earphone (for example, a Bluetooth earphone) and an electronic device is a mobile phone. The method includes the following steps.

401. The mobile phone receives a wearing event sent by the earphone.

The mobile phone may be Bluetooth connected to the earphone (for example, a Bluetooth earphone) for communication based on a Bluetooth link. The Bluetooth connection may include basic rate/enhanced data rate (BR/EDR), Bluetooth low energy (BLE), and the like.

After detecting the wearing event, the earphone may send the wearing event to the mobile phone. The wearing event may carry an identity (ID) and a wearing state of the earphone.

The earphone may include a left earbud (a wireless earphone device to be located in the left ear) or a right earbud (a wireless earphone device to be located in the right ear). One of the left earbud or the right earbud may be used as a primary earbud and the other as a secondary earbud.

The primary earbud and the secondary earbud may be selected based on wireless communications quality corresponding to the primary earbud and the secondary earbud. For example, if a communications link between the left earbud and the mobile phone is better (such as more reliable, faster, or lower power consuming) than a communications link between the right earbud and the mobile phone, the left earbud may act as the primary earbud and the right earbud may act as the secondary earbud. Certainly, other methods for determining the primary earbud and the secondary earbud may be used, and this is not limited in this application.

The primary earbud may communicate with the mobile phone (for example, the primary earbud may send a wearing event of the primary earbud to the mobile phone). The secondary earbud may communicate with the primary earbud (for example, the secondary earbud may send a wearing event of the secondary earbud to the primary earbud). The primary earbud may act as a medium for the secondary earbud to communicate with the mobile phone (for example, the primary earbud may send a wearing event of the secondary earbud to the mobile phone). Alternatively, both the primary earbud and the secondary earbud may communicate with the mobile phone, and this is not limited in this application.

After receiving the wearing event sent by the earphone, the mobile phone may search for a current geographical position of the mobile phone. If it is determined that the mobile phone is located in a residence/at home (a position of the residence/home may be set by the user or determined by the mobile phone according to a preset algorithm), and it is determined that a current scenario is a home scenario, step 402 may be performed.

For example, if the mobile phone activates a positioning function (such as a GPS function or a BeiDou function), it may be determined whether the mobile phone is located at home based on positioning information. Alternatively, if a corresponding mode (for example, a "home mode") in an application program (for example, an AI life app) of the mobile phone is activated, it may be determined that the mobile phone is located at home. Alternatively, if the mobile phone is connected to Wi-Fi at home, it can be determined that the mobile phone is located at home.

402. The mobile phone determines that the current scenario is the home scenario.

Because positioning is usually inaccurate indoors, a usage scenario of the earphone may be recorded based on a scenario mode provided by an application program (for example, an AI life app). When the earphone is subsequently lost, the user can recall quickly and accurately a usage place of the earphone based on the usage scenario of the earphone, so that the user can retrieve the earphone easily.

403. The mobile phone queries a first life scenario.

After receiving the wearing event sent by the earphone, the mobile phone may search for a current life scenario (that is, the first life scenario) from an application program.

A plurality of different life scenarios may be preset in the application program (for example, an AI life app). The different life scenarios are various adjustable, flexible, and multi-scenario supporting home modes with the aid of a series of smart home devices to meet different requirements in a user life, and are a combination of a series of home functions. Different life scenarios are provided for the user to help the user reduce complex device operations and reduce life costs.

The life scenario may include at least one of a sleep scenario, a get-up scenario, a cinema scenario, a dining scenario (such as a breakfast scenario, a lunch scenario, or a dinner scenario), a leisure scenario, a reading scenario, an entertainment scenario, a return home scenario, or a leave home scenario. In the embodiments of this application, a scenario may be replaced with a scene, a mode, or the like, and this is not limited in this application.

For example, in the get-up scenario, at 7:00 in the morning, a bedroom curtain can be slowly pulled aside, a sound box can play soft background music, a toaster can automatically start toasting bread, a coffee maker starts grinding coffee, and a toilet heating device and a water heater start working.

In the entertainment/cinema scenario, a living room light automatically dims, a television and an audio device are turned on, and the user selects a favorite movie to enjoy.

In the leisure/reading scenario, a light becomes softer and weaker, a sound box can start playing light music, a television is turned off, and the user can start reading in a comfortable and elegant environment.

In the leave home scenario, all lights are turned off, and a device that does not need to stand by (such as an air conditioner or a sound box) is powered off. A security system including a magnetic door sensor and an infrared human inductor starts to work, and a smoke alarm works, so that the user can go out in reassurance.

Certainly, each scenario described above may be referred to in other terms, and this is not limited in this application.

Each scenario described above may be manually triggered by the user. For example, the user may trigger immediately (for example, select a scenario directly on an application program of the mobile phone) or may customize a trigger at a preset time (for example, the user may set a 7-o'clock automatic trigger to the get-up scenario). Each scenario may be alternatively triggered by an operation from a smart home device. For example, if a pulled bedroom curtain and an enabled coffee maker are detected, the mobile phone can actively trigger the get-up scenario.

404. The mobile phone determines whether the first life scenario is found.

For example, the mobile phone may invoke a preset application programming interface (API) interface to search for a current life scenario (that is, the first life scenario) from the AI life app.

405. Record the first life scenario and the wearing event if the first life scenario is found.

It should be understood that the first life scenario and the wearing event are corresponding/associated, indicating that the earphone in the first life scenario is in the wearing state.

For example, if it is found that the first life scenario is a get-up scenario, the get-up scenario and the wearing event are recorded, indicating that the earphone in the get-up scenario is in the wearing state.

406. Record a current time/motion state and the wearing event if the first life scenario is not found.

For example, if the AI life app is in an off state, or the AI life app does not run a life scenario, the result cannot be found. In this case, it may be recorded that the earphone at/in the current time/state is in the wearing state. The current time may be a time at which the mobile phone receives the wearing event sent by the earphone or a time at which the earphone sends the wearing event, and the current motion state is used to indicate a current motion state (such as a still state or a walking state) of the user.

407. The mobile phone determines whether the user takes off the earphone.

If the mobile phone receives a taking-off event sent by the earphone, the mobile phone determines that the earphone is taken off by the user. If the mobile phone does not receive a taking-off event sent by the earphone, the mobile phone determines that the earphone is not taken off by the user.

If it is determined that the earphone is not taken off by the user, step 408 may be performed. If it is determined that the earphone is taken off by the user, step 410 may be performed.

408. Determine whether scenario switching occurs, if it is determined that the earphone is not taken off by the user.

Considering that the earphone in the wearing state may experience changes in a plurality of life scenarios, to more accurately record the usage of the earphone, a usage state of the earphone and a switched-to scenario may be recorded continuously when scenario switching occurs.

The AI life app of the mobile phone can complete switching between life scenarios based on an action of a home device. For example, in the entertainment/cinema scenario, if it is detected that a television is turned off and a light is turned on, the entertainment/cinema scenario may be switched to the leisure/reading scenario. For another example, the user may manually switch a life scenario on the AI life app, or the AI life app may automatically switch a scenario at a user-defined time. For example, at 11:00 p.m., the entertainment scenario is automatically switched to the sleep scenario.

If it is determined that no scenario switching has occurred, step 407 may be returned to and performed. If it is determined that scenario switching has occurred, step 409 may be performed.

409. Record a second life scenario and a wearing event if it is determined that scenario switching has occurred.

When the earphone is not taken off by the user, after the mobile phone determines that scenario switching occurs, the mobile phone may search for a switched-to life scenario (that is, the second life scenario) from an application program, and record an association relationship between the second life scenario and the wearing event. The association relationship between the second life scenario and the wearing event indicates that the earphone in the second life scenario is in the wearing state.

410. Search for a third life scenario if it is determined that the earphone is taken off by the user.

After receiving the taking-off event sent by the earphone, the mobile phone may search for a current life scenario (that is, the third life scenario) from an application program (for example, an AI life app).

411. Determine whether the third life scenario is found.

412. Record the third life scenario and the taking-off event if the third life scenario is found.

When the earphone is taken off by the user, the mobile phone may search for a current life scenario (that is, the third life scenario) from an application program and record an association relationship between the third life scenario and the taking-off event. The association relationship between the third life scenario and the taking-off event indicates that the earphone in the third life scenario is in the taking-off state.

413. Record a current time/motion state and the wearing event if the third life scenario is not found.

For the related description, refer to step 406. Details are not described herein again.

Optionally, step 414 and step 415 may be further performed after step 413.

414. Determine whether scenario switching has occurred.

In other words, it is determined whether the electronic device is switched from the third life scenario to another life scenario (for example, a fourth life scenario).

For description of scenario switching, refer to step 408. Details are not described herein again.

415. Record the fourth life scenario and the taking-off event if it is determined that scenario switching has occurred.

When the earphone is taken off by the user, after the mobile phone determines that scenario switching occurs, the mobile phone may search for a switched-to life scenario (that is, the fourth life scenario) from an application program, and record an association relationship between the fourth life scenario and the taking-off event to complete the process.

If it is determined that no scenario switching has occurred, step 414 may be repeatedly performed.

According to the method provided in the embodiment of this application, when the user uses the earphone at home, if the earphone falls off by accident, the user can quickly recall a position of the lost earphone by searching for a historical state of the earphone and a corresponding scenario, so that the user can conveniently and quickly retrieve the earphone.

Figure 5A:
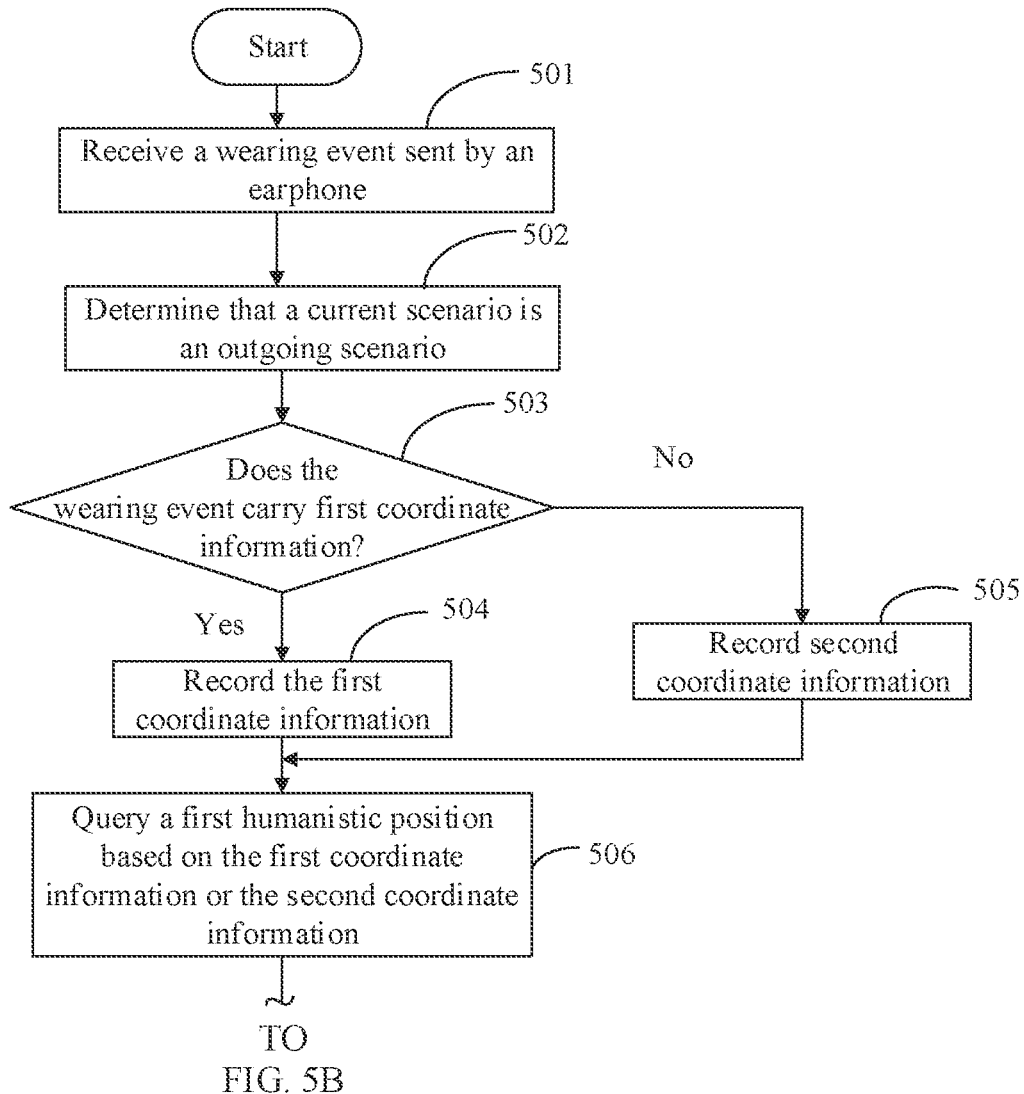
FIG. 5A and FIG. 5B are another flowchart according to an embodiment of this application.
Figure 5B:
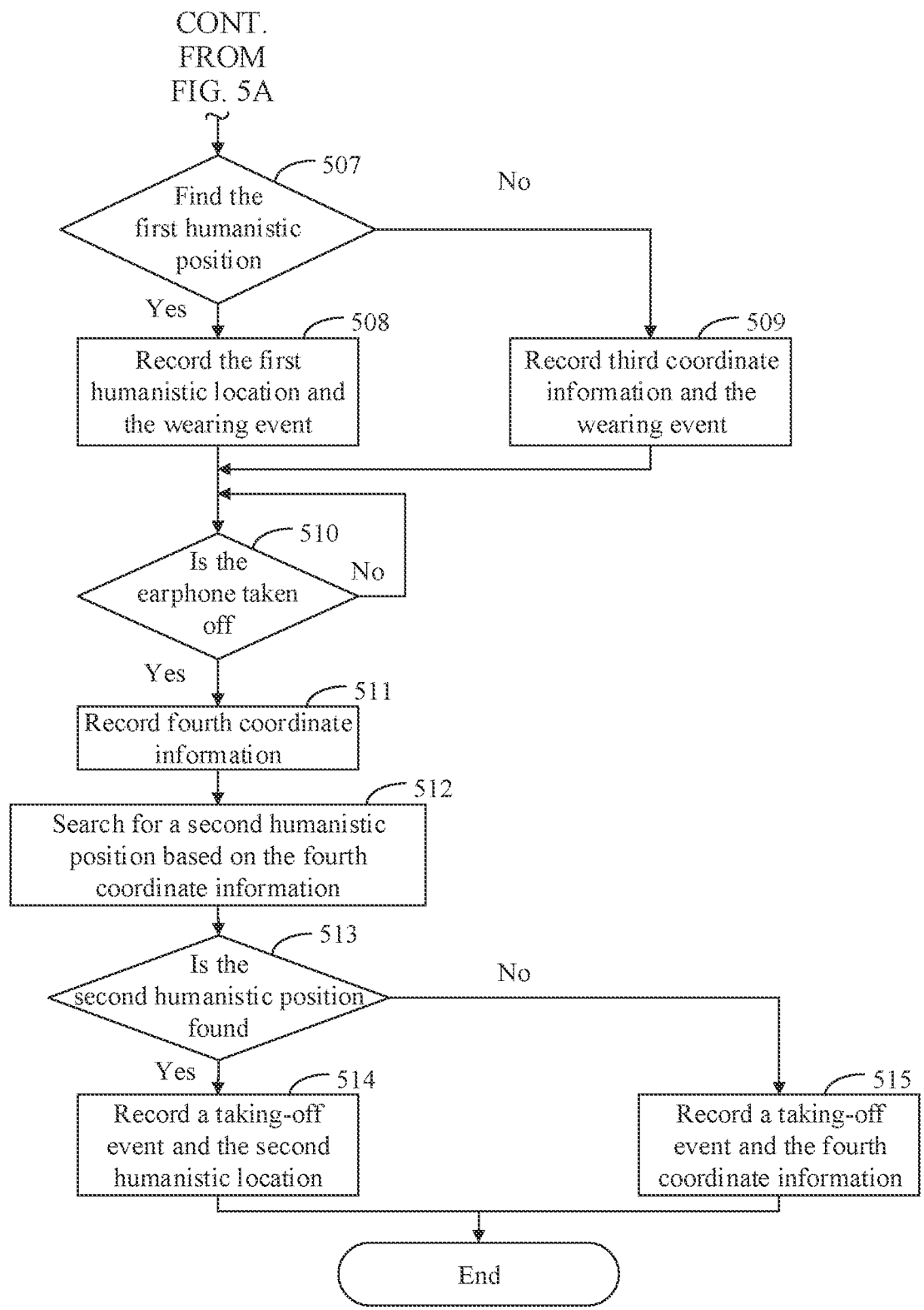

As shown in FIG. 5A and FIG. 5B, an embodiment of this application provides a method for finding a wearable device. The method is described by taking an example in which the wearable device is an earphone (the earphone may be a left earbud or a right earbud) and an electronic device is a mobile phone. The method includes the following steps:

501. The mobile phone receives a wearing event sent by the earphone.

For a related description of the mobile phone receiving the wearing event sent by the earphone, refer to step 401. Details are not described herein again.

It should be noted that after receiving the wearing event sent by the earphone, the mobile phone may search for a current geographical position of the mobile phone, and if it is determined that the mobile phone is located in an area outside a residence/home, it is determined that a current scenario is an outgoing scenario and step 502 may be performed.

For example, if the mobile phone activates a positioning function (such as a GPS function or a BeiDou function), it may be determined, based on positioning information, that the mobile phone is located in an area outside the residence/home, thereby determining that a current scenario is an outgoing scenario. Alternatively, if a corresponding mode (for example, a "leave home mode") in an application program (for example, an AI life app) of the mobile phone is activated, it may be determined that a current scenario is an outgoing scenario. Alternatively, if the mobile phone is connected to Wi-Fi for an area outside the residence/home, it may be determined that a current scenario is an outgoing scenario.

502. The mobile phone determines that a current scenario is an outgoing scenario.

In the outgoing scenario, the earphone may be positioned by using a positioning technology (such as a GPS positioning technology or a BeiDou positioning technology). In this way, when the earphone is subsequently lost, the user can recall quickly and accurately a usage place of the earphone based on the positioning information of the earphone, so that the user can retrieve the earphone conveniently.

503. The mobile phone determines whether the wearing event carries first coordinate information.

The first coordinate information may include a geographical coordinate collected when the earphone detects a wearing event, and the geographical coordinate is used to represent a geographical position of the earphone when the earphone detects the wearing event. For example, if the earphone activates the GPS function, the wearing event reported by the earphone may include a GPS coordinate (that is, the first coordinate information).

504. Record the first coordinate information if the wearing event carries the first coordinate information.

The wearing event is associated with the first coordinate information. It may be considered that the wearing event has occurred in the geographical position indicated by the first coordinate information, to be specific, the user wears the earphone in the geographical position indicated by the first coordinate information.

505. Record second coordinate information if the wearing event does not carry the first coordinate information.

The second coordinate information may include a geographical coordinate collected by the mobile phone when the mobile phone is receiving the wearing event.

The mobile phone may collect a geographical coordinate based on a network positioning technology. The network positioning technology may include a base station positioning technology (a positioning technology based on a cellular mobile communications technology), a Wi-Fi positioning technology (with a principle of detecting an ID (router address) of Wi-Fi by using positioning software and then performing positioning in cooperation with a Wi-Fi position database and a map database thereof), and a GPS positioning technology.

506. Search for a first humanistic position based on the first coordinate information or the second coordinate information.

The mobile phone may search the map database based on the first coordinate information or the second coordinate information to determine whether the first humanistic position can be found. The first humanistic position may be a geographical position having a first name, and the first name may be manually specified. For example, the first name may be a XX cafe, a XX coffeehouse, a XX library, or a XX store in a shopping mall.

In some embodiments, if the earphone does not have a positioning function, step 505 may be performed directly without performing step 503. In addition, in step 506, the first humanistic position may be found directly based on the second coordinate information.

507. Determine whether the first humanistic position is found.

To be specific, it is determined whether the first coordinate information or the second coordinate information has a corresponding first humanistic position, such as a XX cafe, a XX coffeehouse, a XX library, or a XX store in a shopping mall.

508. Record the first humanistic position and the wearing event if the first humanistic position is found.

It should be understood that the first humanistic position and the wearing event are corresponding/associated, indicating that the earphone in the first humanistic position is in the wearing state.

If the first humanistic position can be found, the wearing event and the first humanistic position can be added (stored/pressed) into a first queue as a record (also referred to as an element). The first queue is a first-in, first-out linear table. A size of the first queue may be preset.

Optionally, each record in the first queue is configured with a time stamp. The time stamp may indicate a time at which a record was generated.

509. Record third coordinate information and the wearing event if the first humanistic position is not found.

The third coordinate information may be the first coordinate information or the second coordinate information.

In other words, if the first humanistic position is not found, the wearing event and the coordinate information (the first coordinate information or the second coordinate information) corresponding to the wearing event may be added to the first queue as a record.

510. Determine whether the earphone is taken off by the user.

If the mobile phone receives a taking-off event sent by the earphone, the mobile phone determines that the earphone is taken off by the user. If the mobile phone does not receive a taking-off event sent by the earphone, the mobile phone determines that the earphone is not taken off by the user.

If it is determined that the earphone is not taken off by the user, step 510 may be performed repeatedly. If it is determined that the earphone is taken off by the user, step 511 may be performed.

511. Record fourth coordinate information if it is determined that the earphone is taken off by the user.

In other words, if the mobile phone receives a taking-off event sent by the earphone, the fourth coordinate information is recorded.

The fourth coordinate information may be carried in the taking-off event sent by the earphone, and include a geographical coordinate collected when the earphone detects the taking-off event. The fourth coordinate information may be alternatively determined by the mobile phone, and include a geographical coordinate collected when the mobile phone receives the taking-off event sent by the earphone.

512. Search for a second humanistic position based on the fourth coordinate information.

The second humanistic position may be a geographical position having a second name, and the second name may be manually specified. For example, the second name may be a XX cafe, a XX coffeehouse, a XX library, or a XX store in a shopping Mall. The second humanistic position may be same as or different from the first humanistic position. The second name and the first name may be the same or different.

513. Determine whether the second humanistic position is found.

To be specific, it is determined whether the third coordinate information or the fourth coordinate information has a corresponding second humanistic position, such as a XX cafe, a XX coffeehouse, a XX library, or a XX store in a shopping mall.

514. Record the taking-off event and the second humanistic position if the second humanistic position is found.

It should be understood that the second humanistic position and the taking-off event are corresponding/associated, indicating that the earphone in the second humanistic position is in the taking-off state.

515. Record the taking-off event and the fourth coordinate information if the second humanistic position is not found.

Figure 6:
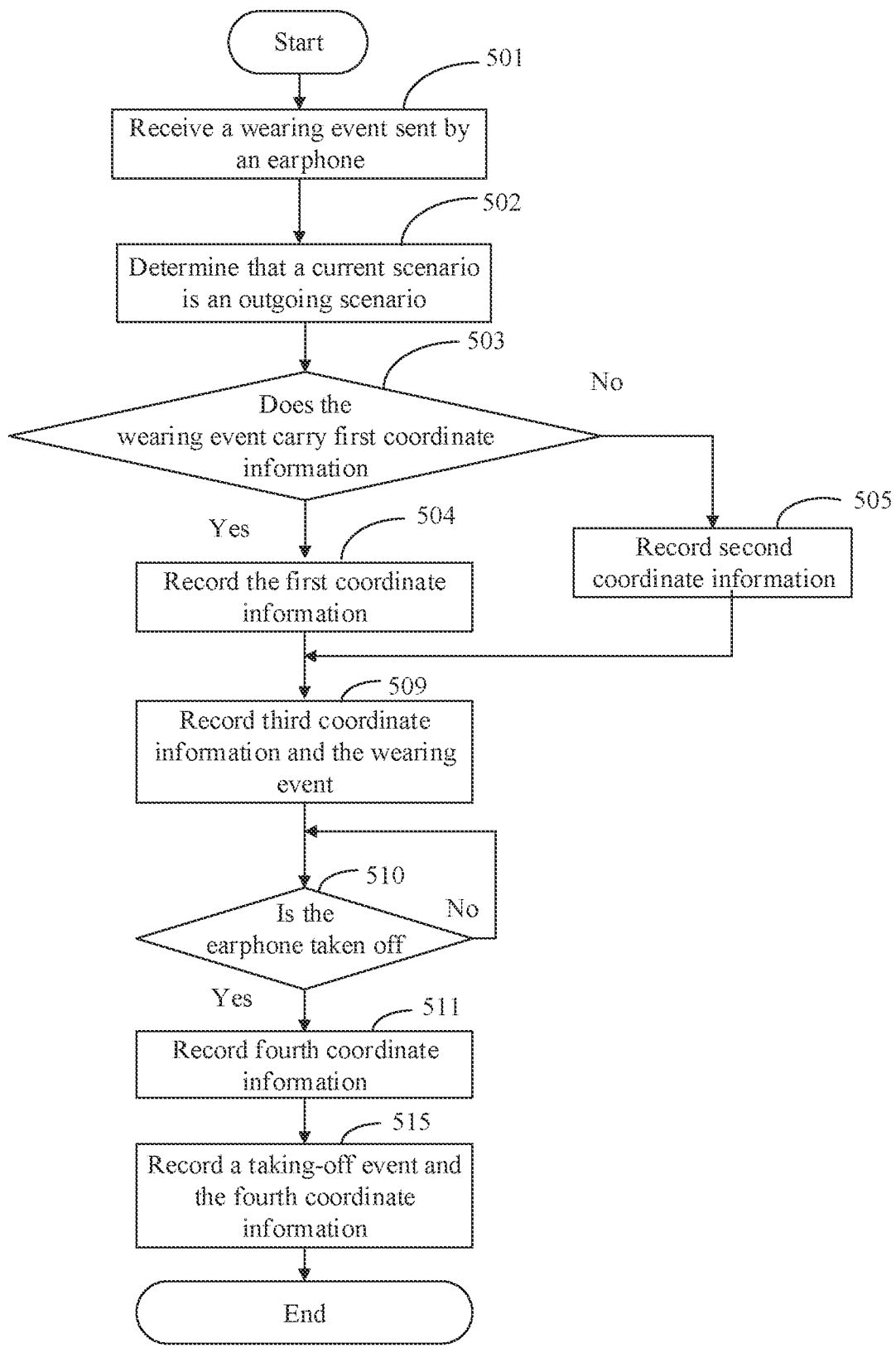
FIG. 6 is another flowchart according to an embodiment of this application.

In some embodiments, after the first coordinate information or the second coordinate information is obtained, the corresponding humanistic position (that is, the first humanistic position) may not be queried. Specifically, as shown in FIG. 6, an embodiment of this application provides a method for finding a wearable device (for example, an earphone), including step 501 to step 505, step 509 to step 511, and step 515. For each step, refer to the related description above. Details are not described herein again.

According to the method provided in the embodiment of this application, when the user uses the earphone outdoors, if the earphone falls off by accident when the user is performing outdoor sports (running, cycling, or hiking in a mountain), the user can quickly recall a position of the lost earphone by searching for a historical state of the earphone and a corresponding geographical coordinate, so that the user can conveniently and quickly retrieve the earphone.

Figure 7A:
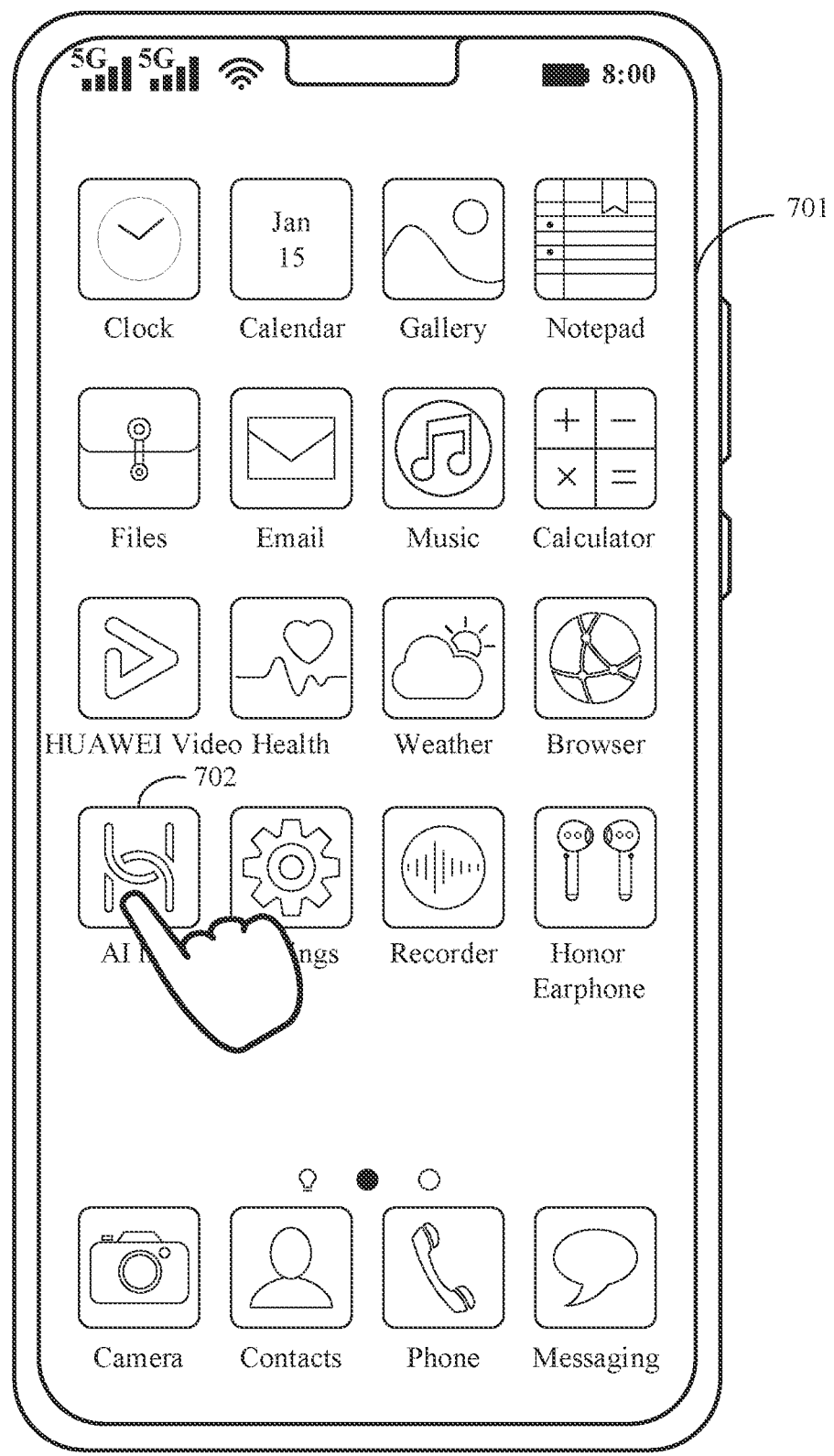
FIG. 7(a) and FIG. 7(b) are a schematic diagram of displaying according to an embodiment of this application.
Figure 7B:
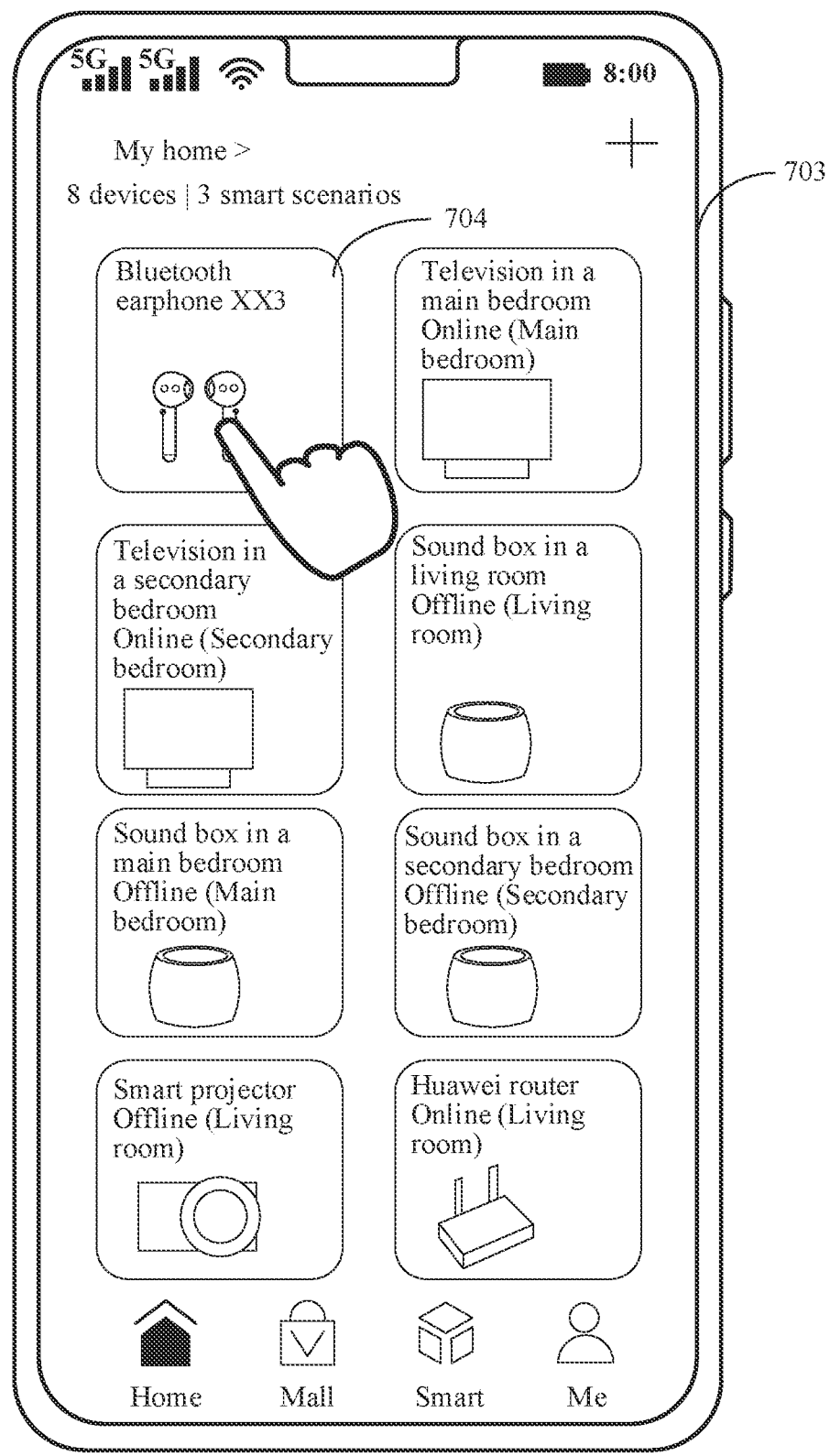
Figure 8:
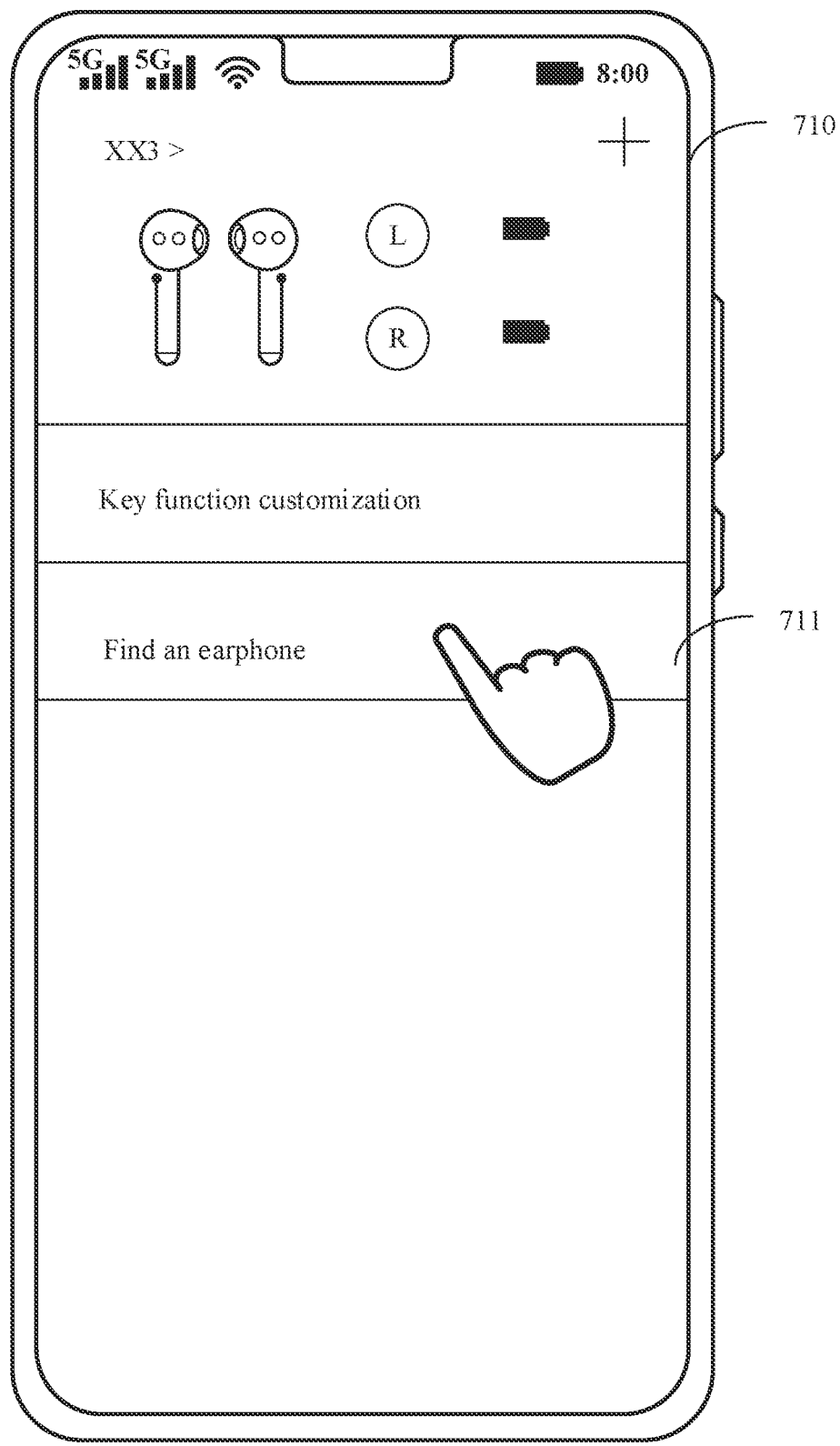
FIG. 8 is another schematic diagram of displaying according to an embodiment of this application.

A UI interface provided in the embodiments of this application is described as follows:

In response to a user operation of tapping "AI life" 702 at a main interface 701 as shown in FIG. 7(a), the mobile phone may display a main interface 703 of the AI life app as shown in FIG. 7(b) and may manage a Bluetooth earphone in the AI life app (for example, the Bluetooth earphone may be named as XX3). In response to a user operation of tapping an icon 704 corresponding to the Bluetooth earphone, as shown in FIG. 8, the mobile phone may display a management interface 710 of the Bluetooth earphone XX3. The management interface 710 may include a case function customization option, an option 711 for finding an earphone, and the like. Certainly, the management interface 710 may also include one or more other management options, and this is not limited in this application.

Figure 9A:
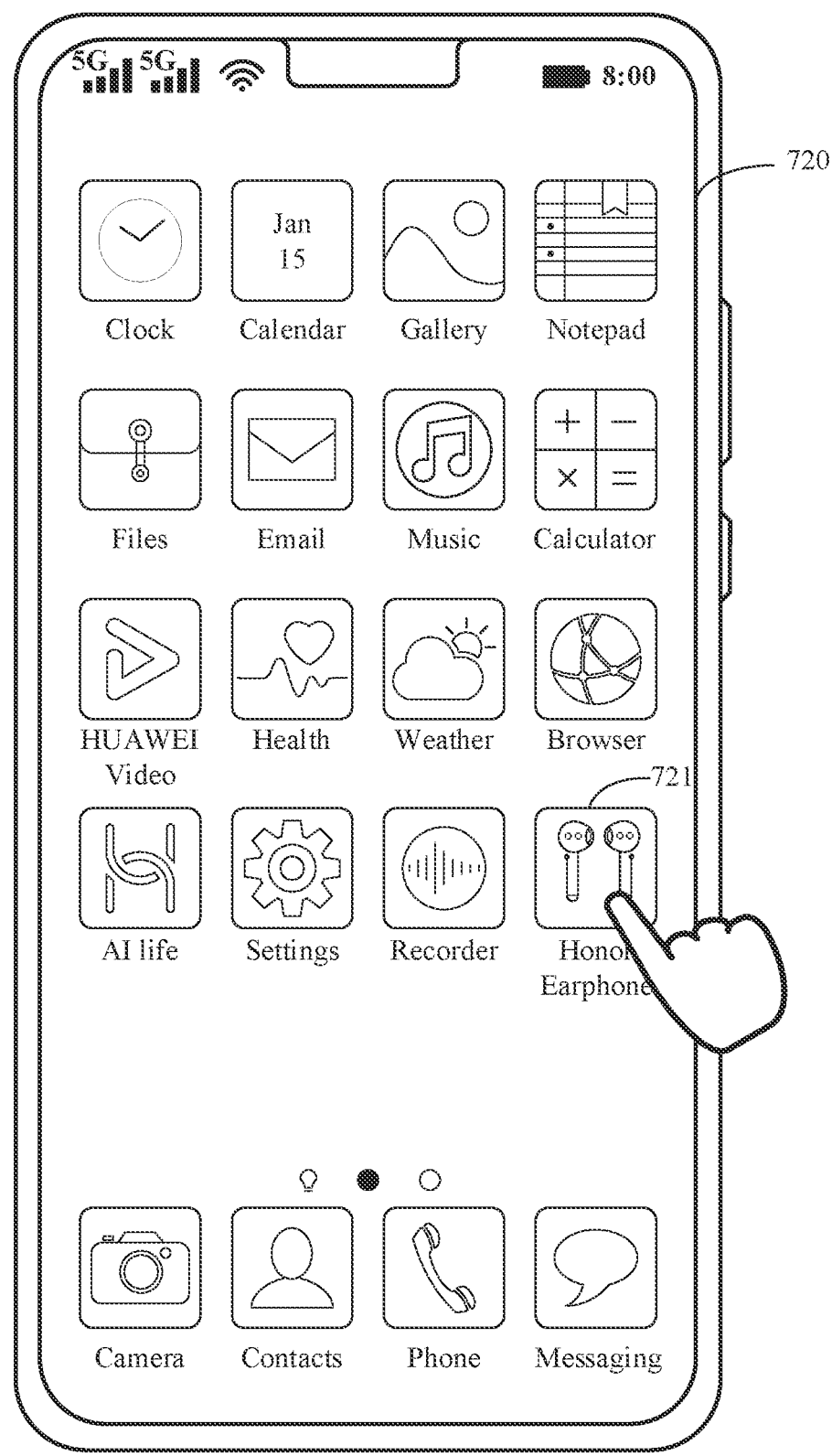
FIG. 9(a) and FIG. 9(b) are another schematic diagram of displaying according to an embodiment of this application.
Figure 9B:
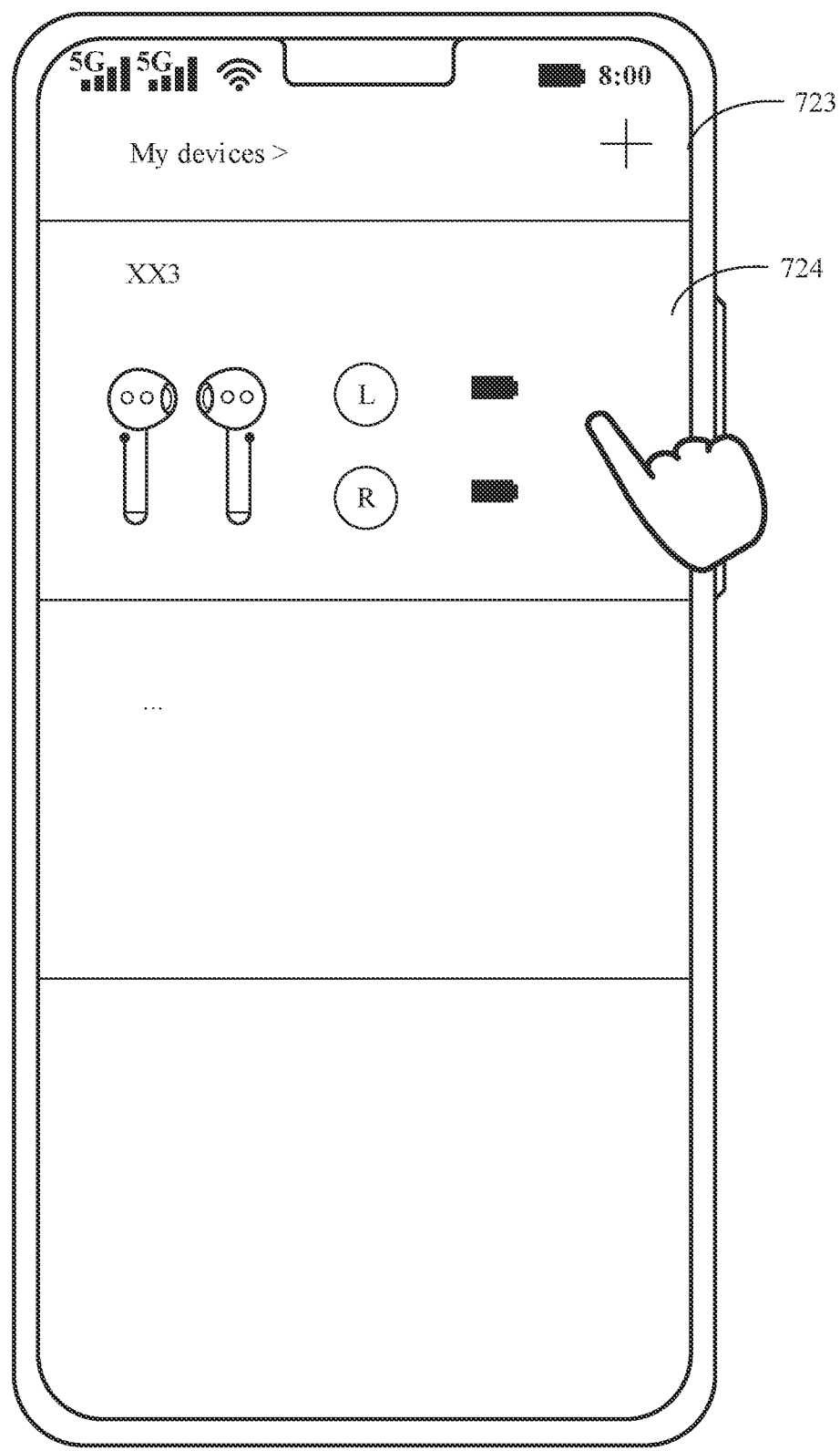

Alternatively, in response to a user operation of tapping an Honor earphone 721 at a main interface 720 as shown in FIG. 9(a), the mobile phone may display a device management interface 723 for an Honor earphone app as shown in FIG. 9(b), and the device management interface 723 may include the Bluetooth earphone XX3. Certainly, one or more other Bluetooth earphones may be included at the device management interface 723, and this is not limited in this application. In response to the user tapping a display area 724 corresponding to the Bluetooth earphone XX3, the mobile phone may display a management interface 710 of the Bluetooth earphone XX3 as shown in FIG. 8.

Figure 10:
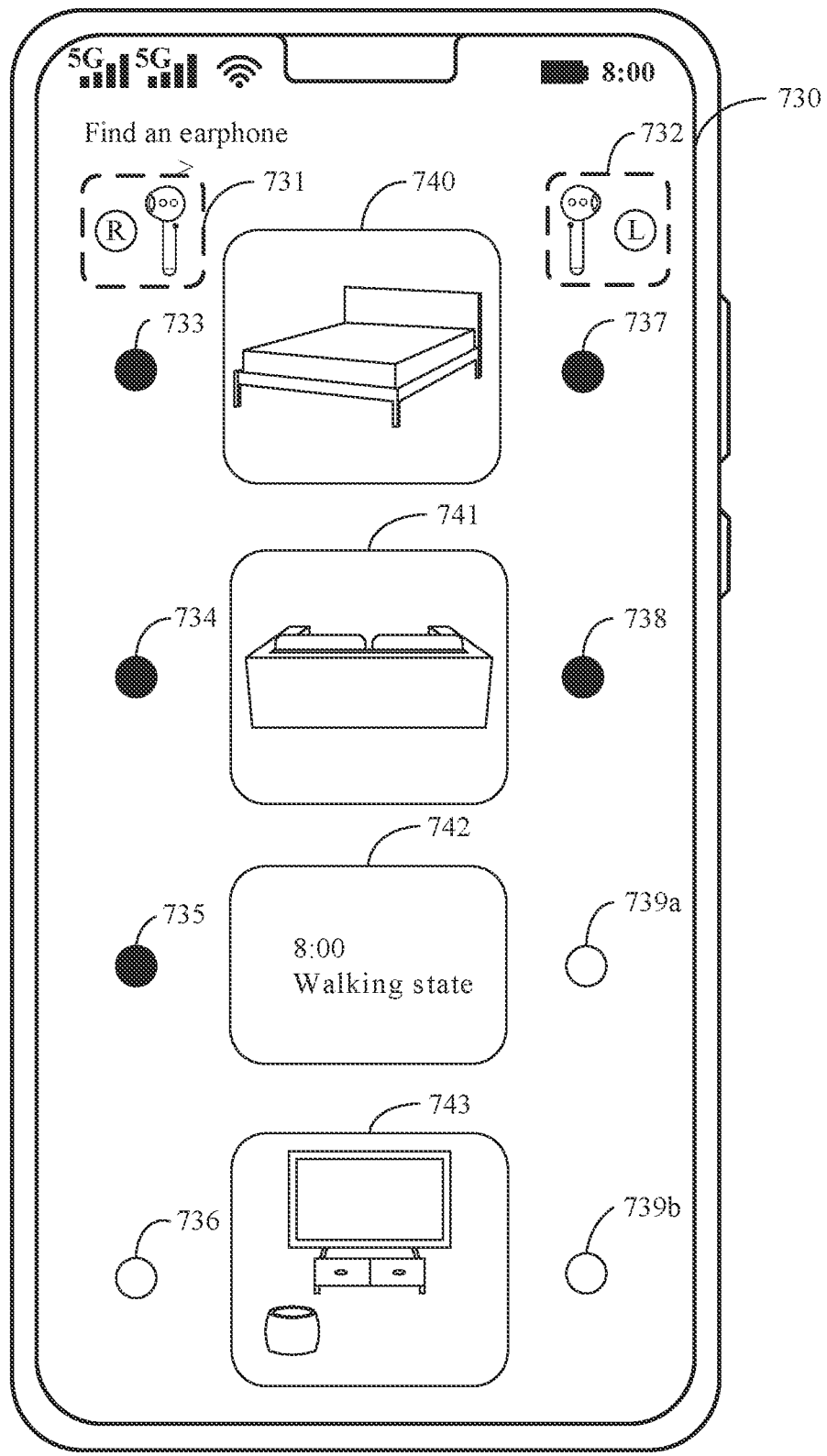
FIG. 10 is another schematic diagram of displaying according to an embodiment of this application.

As shown in FIG. 8, in response to a user operation of tapping the option 711 for finding an earphone at the management interface 710, the mobile phone may display an interface 730 for finding an earphone as shown in FIG. 10. The interface 730 may include a track and a state of the earphone (left earbud and right earbud). The state of the earphone (left earbud and right earbud) may be a wearing state or a taking-off state. The wearing state may be represented by a solid circular icon (such as an icon 733, an icon 734, an icon 735, an icon 737, or an icon 738). The taking-off state may be represented by a hollow circular icon (such as an icon 736, an icon 739a, or an icon 739b). Certainly, the wearing state or the taking-off state may be represented by an icon in another shape or filled with another color, or may be represented by a prompt text. This is not limited in this application. The track of the earphone may include a plurality of scenarios. Each scenario may correspond to one scenario card, for example, a scenario card 740 may represent a sleep scenario (or a rest scenario). A scenario card 741 may represent a leisure scenario or a reading scenario, a scenario card 742 may represent a "blank scenario" ("blank scenario" may refer to a case in which a current scenario cannot be found from an application program (for example, an AI life app)), and a scenario card 743 may represent an entertainment scenario. The state of the earphone and the scenario are associated.

Specifically, the icon 733, the icon 734, and the icon 735 may indicate that the right earbud 731 in scenarios corresponding to the scenario card 740, the scenario card 741, and the scenario card 742 is in the wearing state. The icon 736 may indicate that the right earbud 731 in a scenario corresponding to the scenario card 743 is in the taking-off state. The icon 737 and the icon 738 may indicate that the left earbud 732 in scenarios corresponding to the scenario card 740 and the scenario card 741 is in the wearing state. The icon 739a and the icon 739b may indicate that the left earbud 732 in scenarios corresponding to the scenario card 742 and the scenario card 743 is in the taking-off state.

When the user is incapable of recalling the last placement position of the earphone for a while, the life scenario record of the earphone in use as shown in FIG. 10 greatly helps the user recall a scenario in which the earphone is used last time, thereby helping the user to narrow a search range and quickly retrieve the earphone.

To achieve an effect of retrieving both the earbuds (left earbud and right earbud), scenario and state records can be maintained for the left earbud and the right earbud separately. It should be understood that scenario and state records corresponding to each earphone may form a data queue, each piece of data includes a scenario and a state in the scenario, and a state in the data at the end of the queue is typically taking-off.

In a possible design, it is possible to maintain separately scenario and state records of the left earbud and the right earbud in use for last N times, where N is a positive integer greater than or equal to 1. In another possible design, it is possible to maintain separately scenario and state records of the left earbud and the right earbud in last M time units, where M is a positive integer greater than or equal to 1. The time units may include minutes, hours, days, months, and the like. It should be understood that a single use process of the earphone includes the entire process of the earphone from the occurrence of the wearing event to the taking-off event.

The following is described by taking an example in which the mobile phone separately maintains the scenario and state record of the left earbud and the right earbud for the latest use. As shown in (a) in FIG. 11, after the mobile phone receives a wearing event of the right earbud, the mobile phone may search for a current scenario from the AI life app, and may record a current scenario (for example, a sleep scenario 751) and a state (for example, a wearing state 755). The scenarios in the AI life app may be automatically determined by the mobile phone based on a preset parameter (such as a time or electronic device data (for example, whether the electronic device is turned on)), or may be manually selected by the user. This is not limited in this application. Further, if the mobile phone detects that the AI life app has undergone scenario switching, the mobile phone may record a switched-to scenario (for example, a leisure scenario 752) and a state (for example, a wearing state 756). Further, if the mobile phone receives a taking-off event sent by the right earbud, the mobile phone may search for a current scenario from the "AI life". If the current scenario cannot be found (for example, the AI life app is turned off, or the user does not manually select a scenario), the mobile phone may record a "blank scenario" 753 and a state (for example, a taking-off state 757). Optionally, a current time and/or a user state may be recorded based on the "blank scenario". The user state may be obtained based on data of a sensor (for example, a gyroscope). Because the mobile phone cannot find the current scenario when the user takes off the right earbud, it is difficult for the user to recall a position of the lost earbud when the user is searching for the earbud subsequently. Therefore, to help the user recall a time and a position of the lost right earbud to the greatest extent, after the mobile phone records the "blank scenario" when the right earbud is in the taking-off state, if scenario switching is detected, the mobile phone may further record a switched-to scenario (for example, an entertainment scenario 754) and a state (for example, a taking-off state 758).

Figure 11:
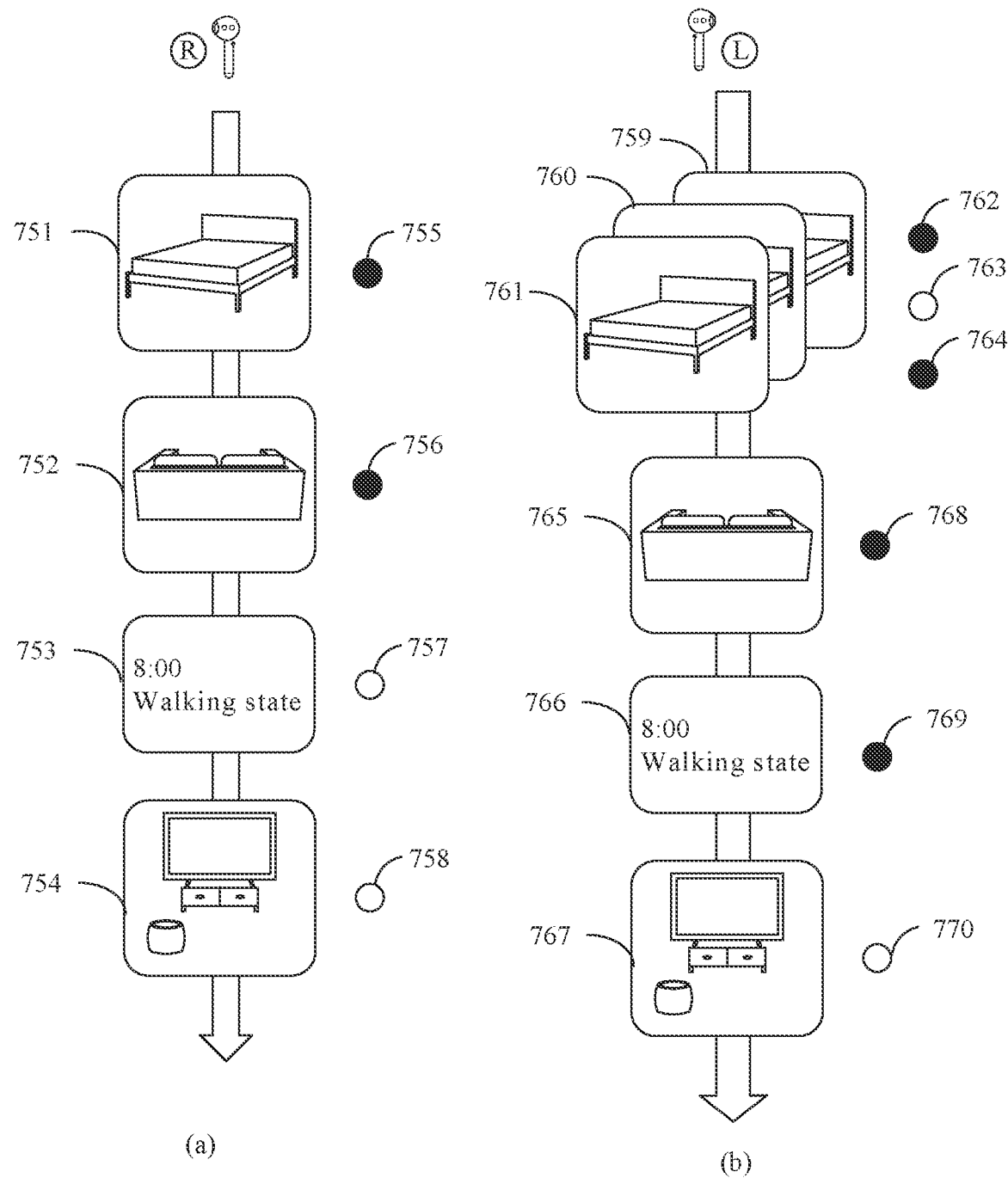
FIG. 11 is a schematic diagram of a scenario and a state of earphone maintenance according to an embodiment of this application.

Similarly, as shown in (b) in FIG. 11, after the mobile phone receives the wearing event of the left earbud and determines that the left earbud is in the wearing state, the mobile phone may search for a current scenario from the AI life app, and record a current scenario (for example, a sleep scenario 759) and a state (for example, a wearing state 762). It should be noted that the user may have made a plurality of wearing and taking-off actions in the same scenario (for example, the user may frequently adjust a position of the earphone when the user is wearing the earphone for the first time), in other words, the mobile phone may receive a plurality of wearing events and taking-off events. The frequent switching between different states (the wearing state and the taking-off state) in the same scenario can be considered as a "jitter", and therefore an "anti-jitter" process is required. For example, scenarios and states recorded within a preset time interval (for example, 5 s) may be normalized to keep only a state and a scenario last recorded within the preset time interval. As shown in (b) in FIG. 11, the wearing state 762 corresponding to the sleep scenario 759, the taking-off state 763 corresponding to the sleep scenario 760, and the wearing state 764 corresponding to the sleep scenario 761 may be normalized to keep only the last recorded state and scenario: the wearing state 764 and the sleep scenario 761.

Further, as shown in (b) in FIG. 11, if the mobile phone detects that the AI life app has undergone scenario switching, the mobile phone may record a switched-to scenario (for example, a leisure scenario 765) and a state (for example, a wearing state 768). If the mobile phone detects that the AI life app exits the leisure scenario 765 but does not find anew scenario, the mobile phone may record a "blank scenario" 766 and a state (for example, a wearing state 769). Further, if the mobile phone receives a taking-off event sent by the left earbud, the mobile phone may search for a current scenario from the "AI life" and record the current scenario (for example, an entertainment scenario 767) and a state (for example, a taking-off state 770).

Figure 12A:
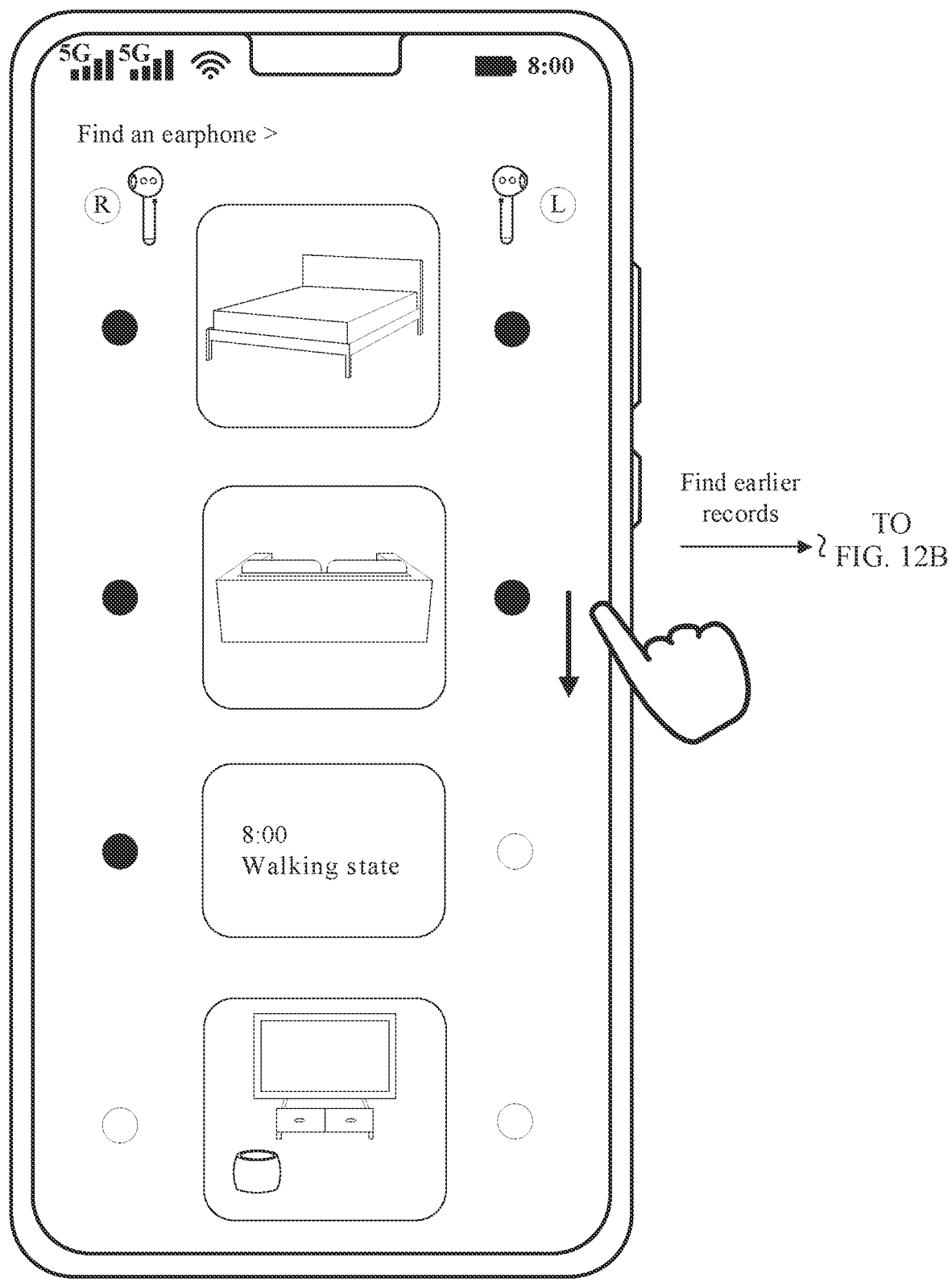
FIG. 12A and FIG. 12B are another schematic diagram of displaying according to an embodiment of this application.
Figure 12B:
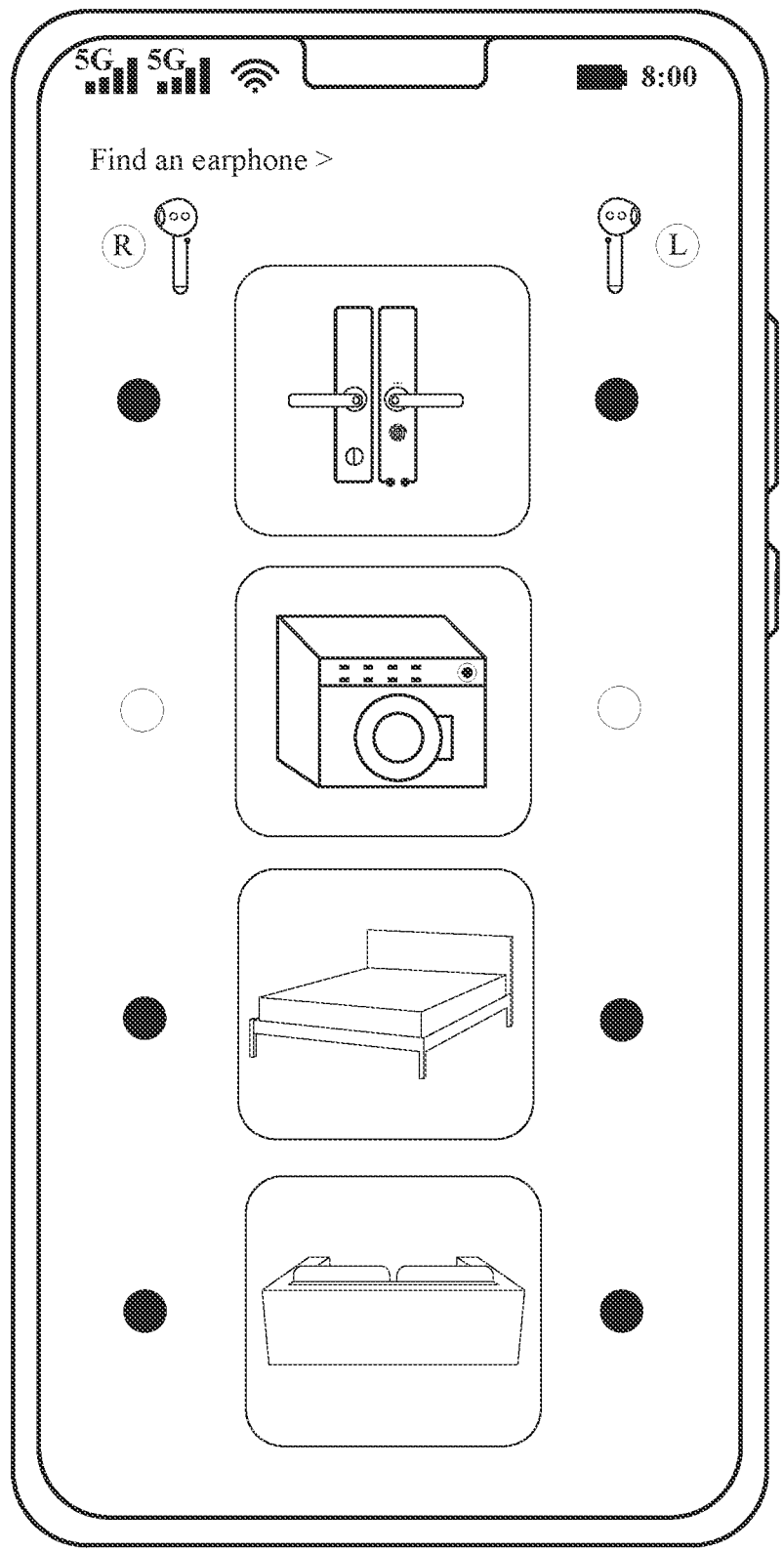

As shown in FIG. 12A and FIG. 12B, if the user has recently used the earphone indoors, the mobile phone may display the latest scenario and state of the earphone by default, and the user may search for more history records (earlier scenario and state of the earphone) with a flick down operation. Certainly, the user may return the latest scenario and state with a flick up operation.

Alternatively, in the vicinity of each scenario card, a time (for example, the time at which the mobile phone finds the scenario) corresponding to the scenario may be displayed.

In this way, the scenarios and the states of the earphone at different times can be displayed to the user, and the user can recall a possible position of the lost earphone based on the scenarios and the states of the earphone, so that the user can conveniently and quickly retrieve the earphone.

Figure 13:
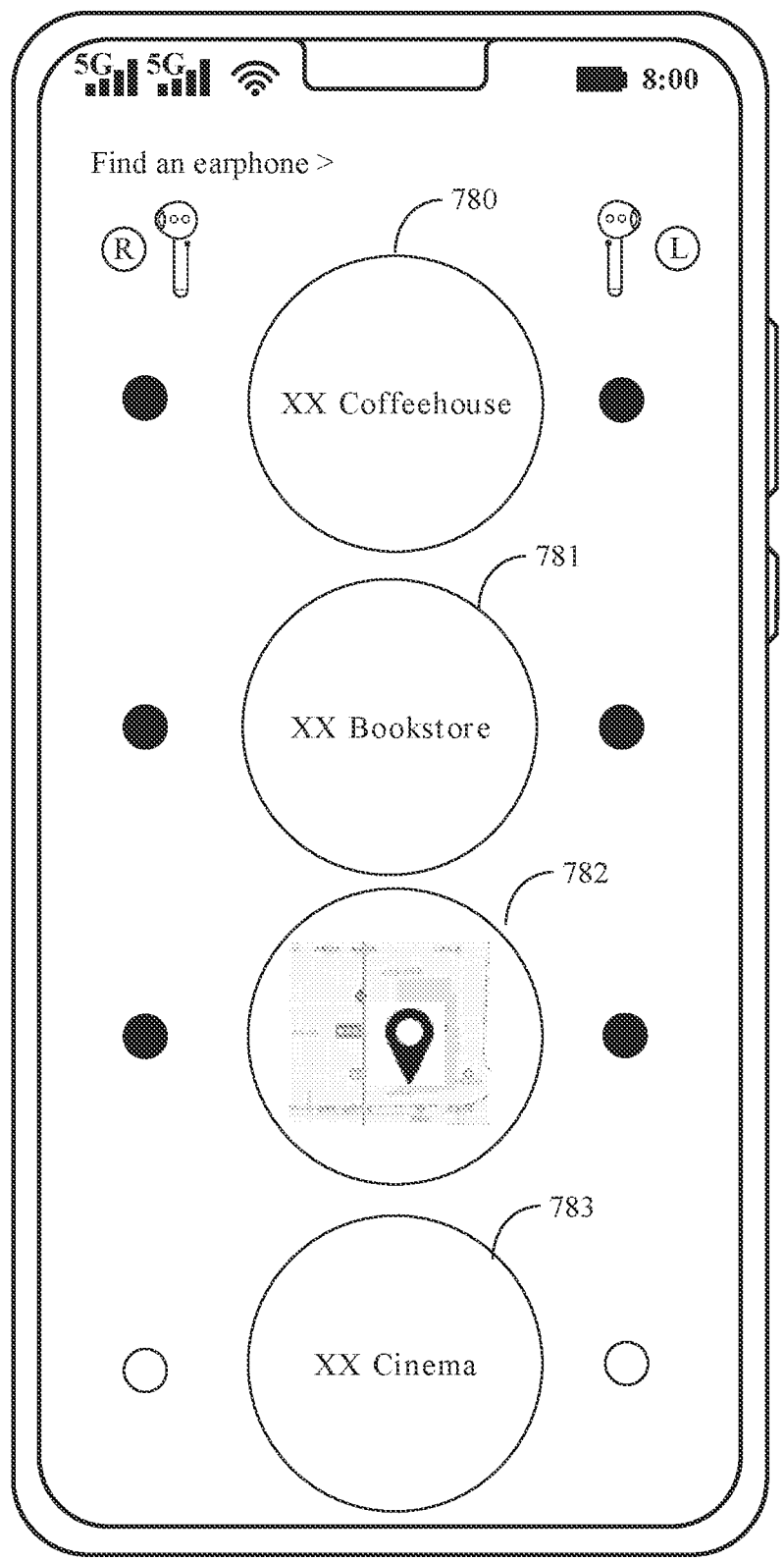
FIG. 13 is another schematic diagram of displaying according to an embodiment of this application.

As shown in FIG. 13, when a user uses an earphone in an outgoing scenario, a mobile phone may record a position of the earphone and a corresponding state and display the position and the corresponding state to the user, and the position of the earphone may include a humanistic position and a geographical coordinate. The geographical coordinate may be converted into a visualization map by a geographical decoder (GeoDecoder) corresponding to a map supplier. If the user taps a corresponding position card (such as a position card 780, a position card 781, a position card 782, or a position card 783), the mobile phone may open the map and display a corresponding position in the map.

Alternatively, the scenario card and the position card may be distinguished by different elements (shapes or texts) or colors. For example, the scenario card may be square, and the position card may be circular, so that a user can more conveniently distinguish between an outgoing scenario (for example, outdoor) and a home scenario, making the UI interface more intuitive.

Figure 14:
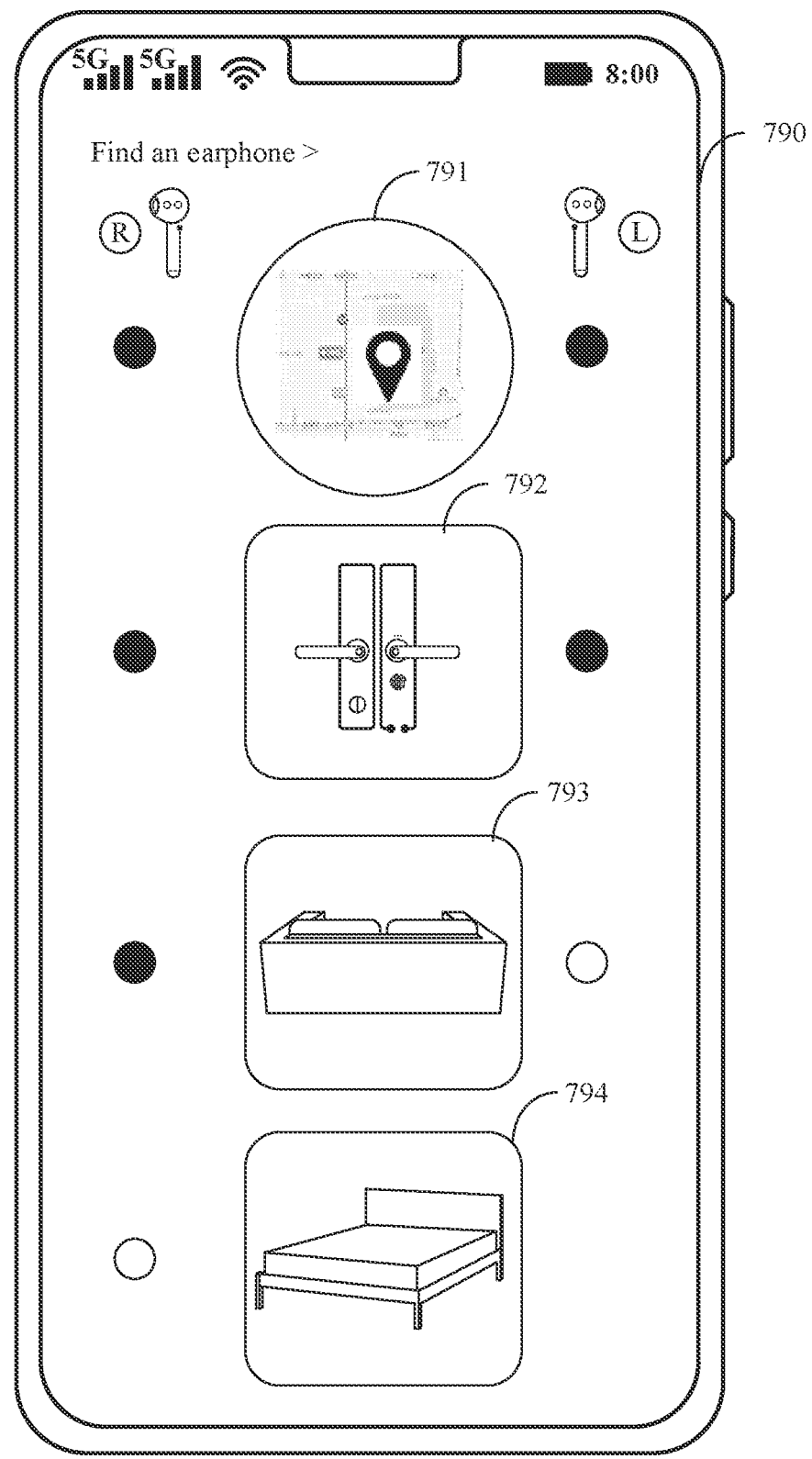
FIG. 14 is another schematic diagram of displaying according to an embodiment of this application.

In some embodiments, if the user in use of the earphone is walking inside a house from outside, an interface 790 may be displayed as shown in FIG. 14. The interface 790 may include a position card 791 corresponding to the outdoors and a scenario card 792, scenario card 793, and scenario card 794 that are corresponding to the indoor house (in the home scenario).

Figure 15:
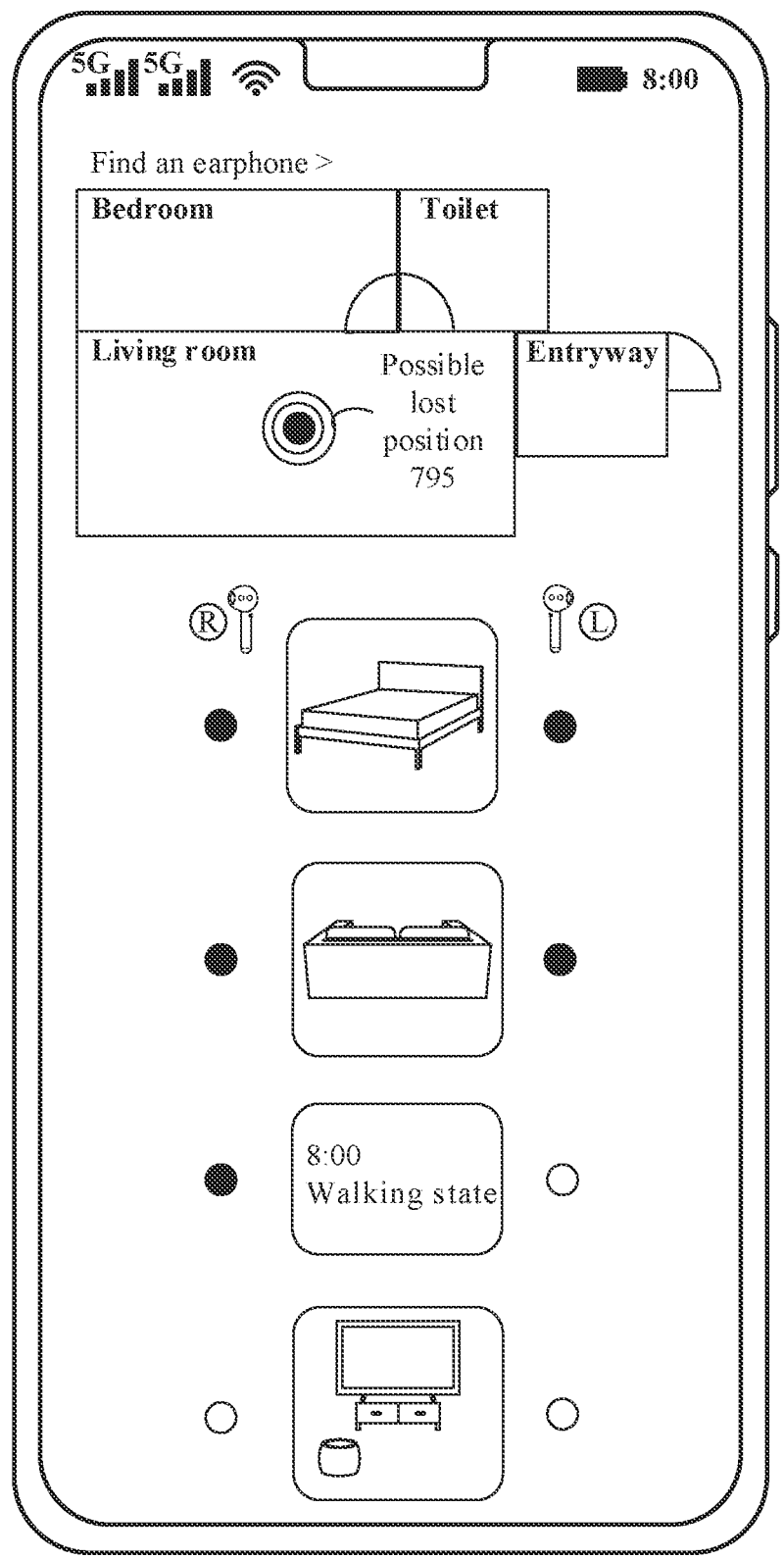
FIG. 15 is another schematic diagram of displaying according to an embodiment of this application.

In some embodiments, as shown in FIG. 15, the mobile phone calculates a possible position 795 of the lost earphone based on a history record (a scenario record or a position record of the mobile phone in use) and prompts the user.

The foregoing embodiments are described by taking an example in which the wearable device is an earphone, but the embodiments of this application does not limit a type of the wearable device. For example, alternatively, the wearable device may be a wristband, a watch, or glasses.

Further, in some embodiments, the electronic device may make more prompts to the user based on the usage scenario of the wearable device. For example, the user may be prompted that a watch is not worn in a sports state or that glasses are not worn in a reading state.

In this way, the wearing/taking-off state of the wearable device is associated with the geographical position or the life scenario and recorded, so that the user can better recall a position of the lost wearable device, the user can conveniently retrieve the wearable device, and the user experience is improved.

Figure 16:
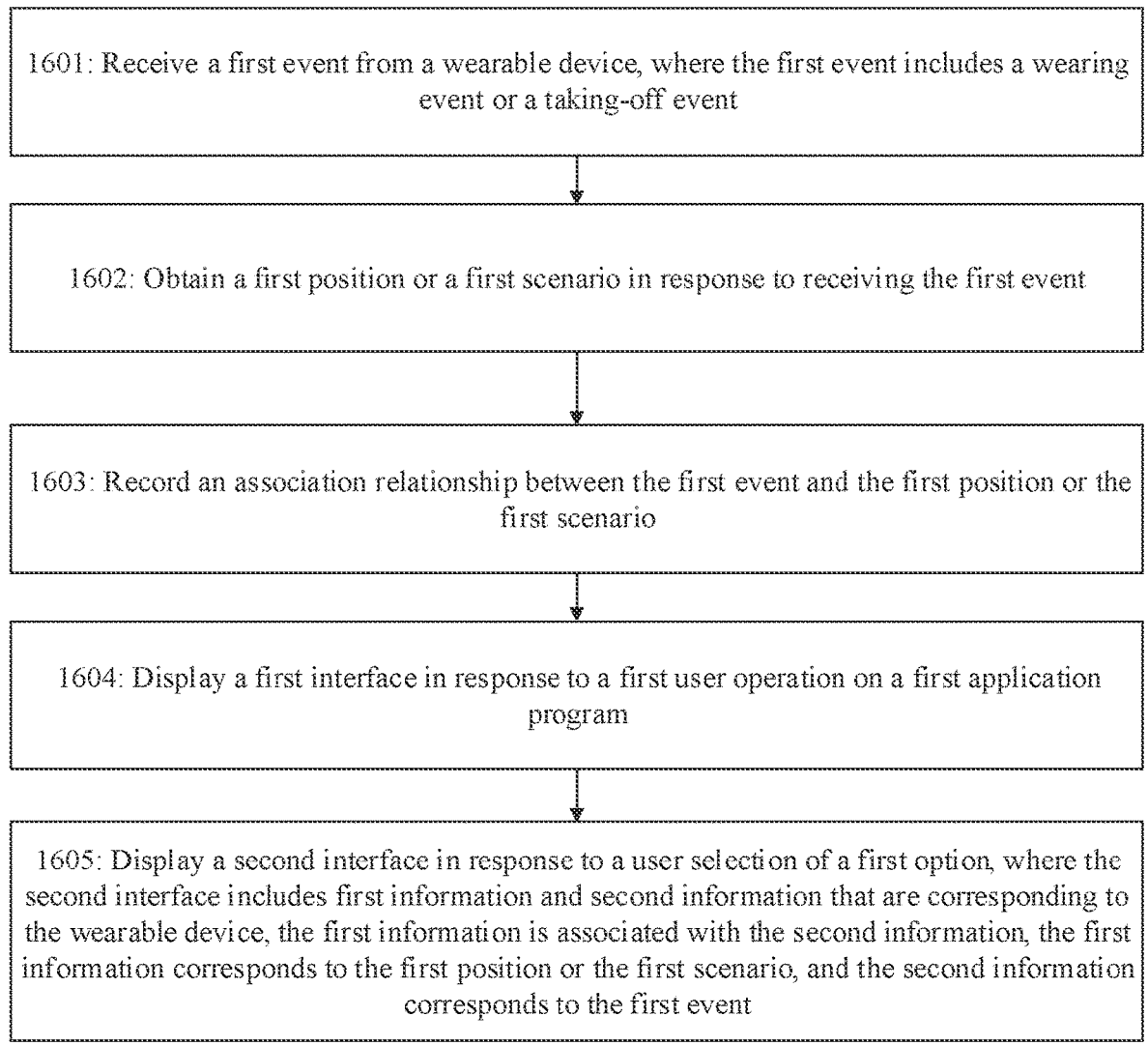
FIG. 16 is another flowchart according to an embodiment of this application.

As shown in FIG. 16, an embodiment of this application provides a method for finding a wearable device, applied to an electronic device. The method includes the following steps:

1601. Receive a first event from the wearable device, where the first event includes a wearing event or a taking-off event.

1602. Obtain a first position or a first scenario in response to receiving the first event, where the first position is used to indicate a geographical position of the electronic device or the wearable device, and the first scenario is used to indicate a home state of a user.

The first scenario may be the first life scenario described above, and the first position may be a position indicated by the first coordinate information described above.

The first scenario is obtained if it is determined that the electronic device is located in a preset residence area; or the first position is obtained if it is determined that the electronic device is located in an area outside the preset residence area. The preset residence area may be a residence/home.

In a possible design, the electronic device obtains a first position from the wearable device, and the first position is used to indicate the geographical position of the wearable device. Alternatively, the electronic device obtains a first position based on a network positioning technology, and the first position is used to indicate the geographical position of the electronic device. The network positioning technology includes a base station positioning technology, a wireless fidelity Wi-Fi positioning technology, and a global satellite positioning system GPS positioning technology.

For example, the first position is indicated by a geographical coordinate of the wearable device or the electronic device. Alternatively, the first position is indicated by a first name determined based on a geographical coordinate of the wearable device or the electronic device.

In a possible design, the first scenario may be found from a second application program. The second application program includes a plurality of scenarios. The plurality of scenarios includes at least one of a sleep scenario, a get-up scenario, a cinema scenario, a dining scenario, a leisure scenario, a reading scenario, an entertainment scenario, a return home scenario, or a leave home scenario.

In a possible design, the electronic device determines whether to switch from the first scenario to a second scenario, and the first scenario is different from the second scenario. If it is determined to switch from the first scenario to the second scenario, an association relationship between the first event and the second scenario is recorded.

In a possible design, the electronic device may also receive a second event. When the first event is a wearing event, the second event is a taking-off event; or when the first event is a taking-off event, the second event is a wearing event. The electronic device obtains a second position or a third scenario. The second position is used to indicate a geographical position of the electronic device or the wearable device, and the third scenario is used to indicate a home state of the user. The electronic device records an association relationship between the second event and the second position or the third scenario.

1603. Record an association relationship between the first event and the first position or the first scenario.

1604. Display a first interface in response to a first user operation on a first application program, where the first interface includes a first option for finding the wearable device.

For example, the first interface may be, for example, the interface 710 shown in FIG. 8, and the first option may be, for example, the option 711 for finding an earphone.

1605. Display a second interface in response to a user operation of selecting the first option, where the second interface includes first information and second information that are corresponding to the wearable device, the first information is associated with the second information, the first information corresponds to the first position or the first scenario, and the second information corresponds to the first event.

For example, when the wearable device is a Bluetooth earphone including a left earbud and a right earbud, the second interface includes first information and second information that are corresponding to the left earbud and first information and second information that are corresponding to the right earbud. For example, as shown in FIG. 10, an interface 730 (second interface) may include first information (such as an icon 737 and an icon 738 that are corresponding to the wearing state, and an icon 739*a* and an icon 739*b* that are corresponding to the taking-off state) and second information (such as a scenario card 740, a scenario card 741, and a scenario card 742 that are corresponding to different scenarios) that are corresponding to the left earbud. The interface 730 (second interface) may also include first information (such as an icon 733, an icon 734, and an icon 735 that are corresponding to the wearing state, and an icon 736 corresponding to the taking-off state) and second information (such as a scenario card 740, a scenario card 741, and a scenario card 742 that are corresponding to different scenarios) that are corresponding to the right earbud. The second information corresponding to the left earbud and the second information corresponding to the right earbud may be represented by a same scenario card.

When the first information corresponds to the first position, a visualization map is displayed in response to a user operation on the first information, and the first position is indicated in the visualization map.

According to the method provided in the embodiment of this application, the wearing/taking-off state of the wearable device is associated with the geographical position or the life scenario and recorded, so that the user can better recall a position of the lost wearable device, the user can conveniently retrieve the wearable device, and the user experience is improved.

It should be noted that the electronic device in the embodiment of FIG. 16 may be the mobile phone in the foregoing embodiments, and the wearable device may be a Bluetooth earphone. For a part not described in detail in the embodiment of FIG. 16, refer to the foregoing embodiments. Details are not described herein again.

Figure 17:
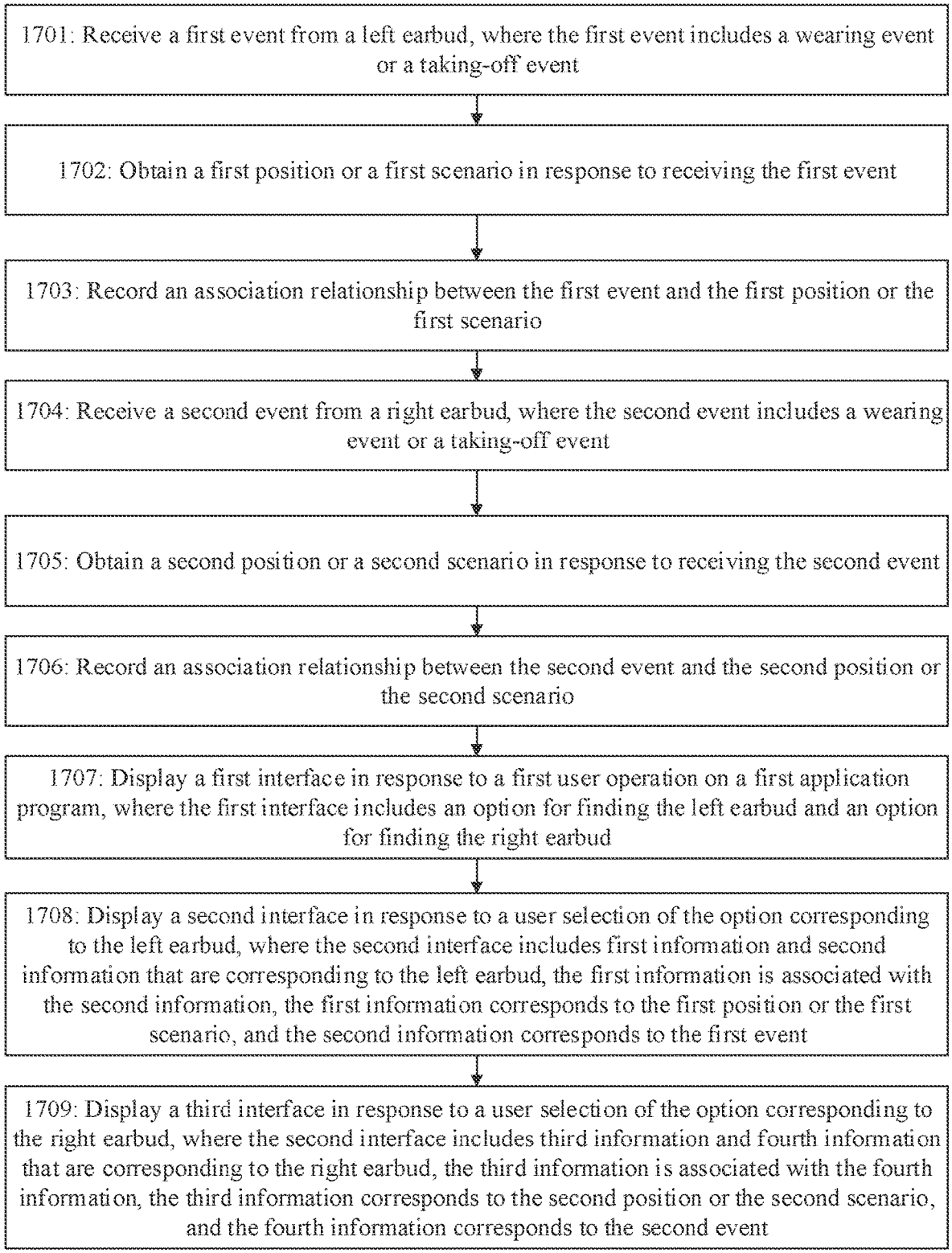
FIG. 17 is another flowchart according to an embodiment of this application.

As shown in FIG. 17, an embodiment of this application provides a method for finding a wearable device (for example, the wearable device is a Bluetooth earphone including a left earbud and a right earbud), applied to an electronic device. The method includes the following steps:

1701. Receive a first event from the left earbud, where the first event includes a wearing event or a taking-off event.

1702. Obtain a first position or a first scenario in response to receiving the first event.

The first position is used to indicate a geographical position of the electronic device or the left earbud, and the first scenario is used to indicate a home state of a user.

1703. Record an association relationship between the first event and the first position or the first scenario.

1704. Receive a second event from the right earbud, where the second event includes a wearing event or a taking-off event.

1705. Obtain a second position or a second scenario in response to receiving the second event, where the second position is used to indicate a geographical position of the electronic device or the right earbud, and the second scenario is used to indicate a home state of the user.

1706. Record an association relationship between the second event and the second position or the second scenario.

It should be noted that an execution sequence between steps 1701 to 1703 and steps 1704 to 1706 is not limited in this application. Steps 1701 to 1703 may be performed before steps 1704 to 1706, or steps 1704 to 1706 may be performed before steps 1701 to 1703, or steps 1701 to 1703 and steps 1704 to 1706 may be performed simultaneously.

1707. Display a first interface in response to a first user operation on a first application program, where the first interface includes an option for finding the left earbud and an option for finding the corresponding right earbud.

Figure 18A:
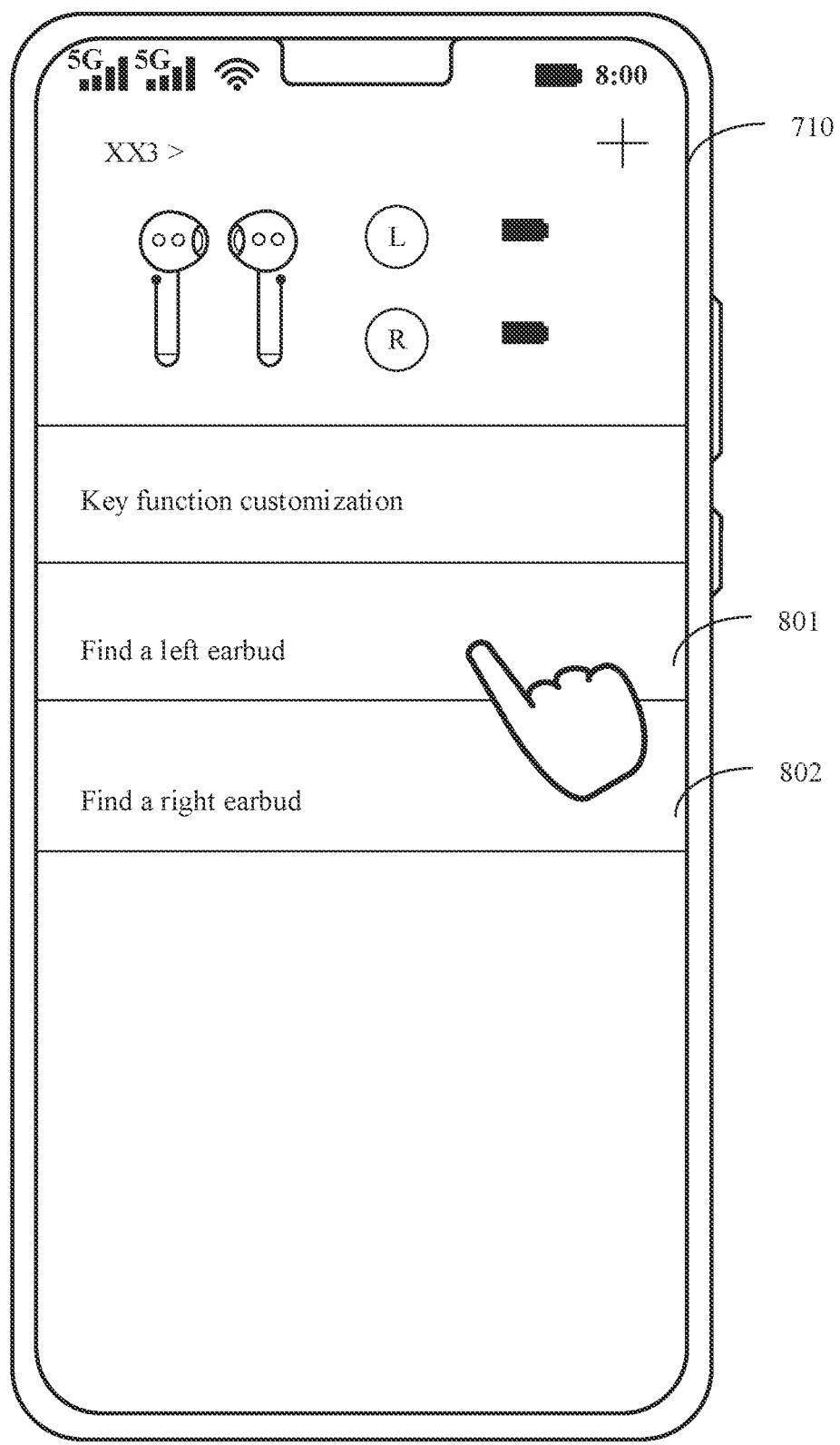
FIG. 18(a) and FIG. 18(b) are another schematic diagram of displaying according to an embodiment of this application.
Figure 18B:
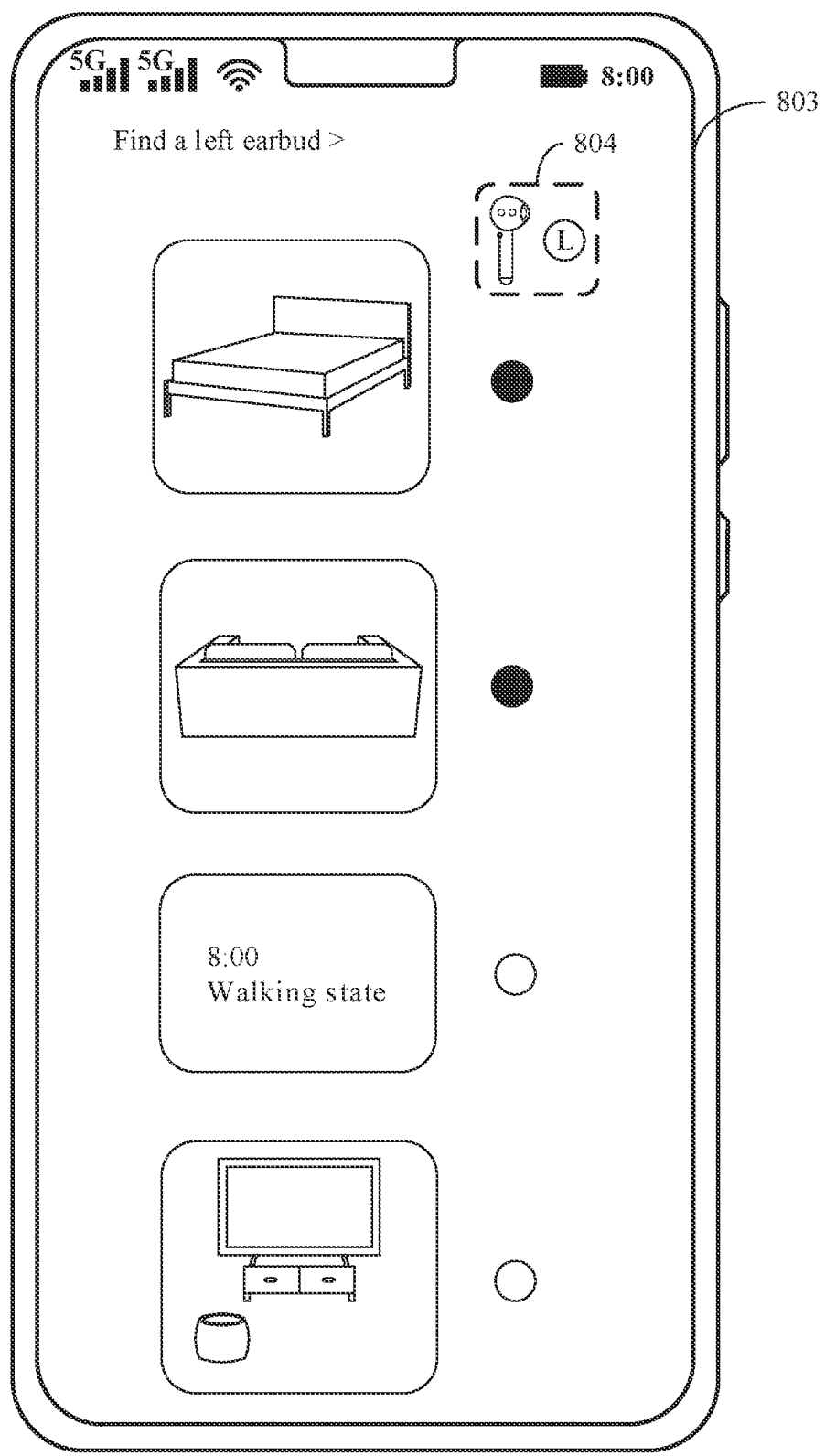

For example, as shown in FIG. 18(*a*), an electronic device (for example, a mobile phone) may display an interface 710 (a first interface). The interface 710 includes an option 801 for finding a left earbud and an option 802 for finding a right earbud.

1708. Display a second interface in response to a user selection of the option corresponding to the left earbud, where the second interface includes first information and second information that are corresponding to the left earbud, the first information is associated with the second information, the first information corresponds to a first position or a first scenario, and the second information corresponds to a first event.

For example, in response to the user selection of the option 801 corresponding to the left earbud as shown in FIG. 18(*a*), the mobile phone may display an interface 803 (second interface) as shown in FIG. 18(*b*). The interface 803 may display scenarios and states corresponding to the left earbud 804.

1709. Display a third interface in response to a user selection of the option corresponding to the right earbud, where the second interface includes third information and fourth information that are corresponding to the right earbud, the third information is associated with the fourth information, the third information corresponds to the second position or the second scenario, and the fourth information corresponds to the second event.

Figure 19A:
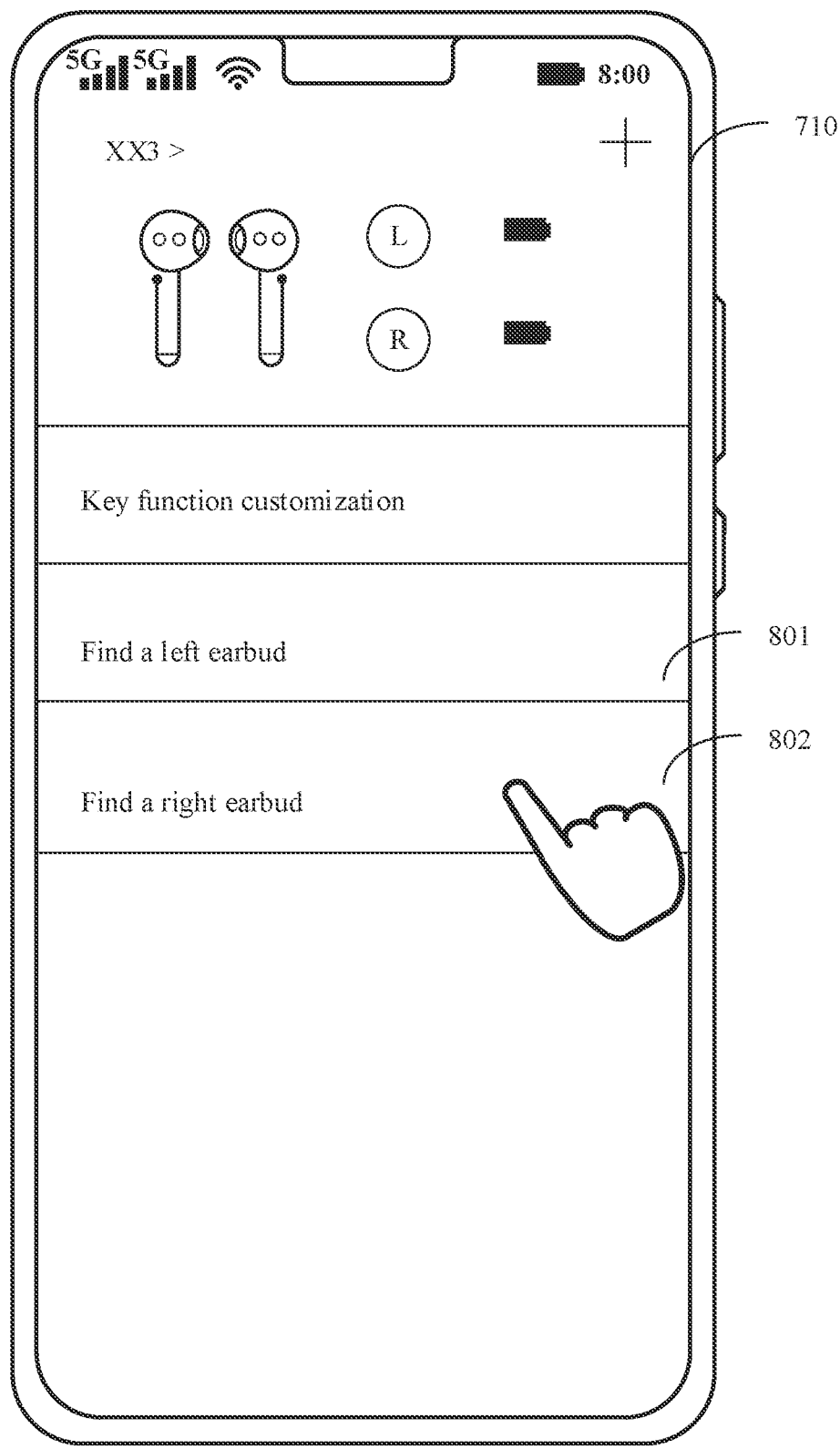
FIG. 19(a) and FIG. 19(b) are another schematic diagram of displaying according to an embodiment of this application.
Figure 19B:
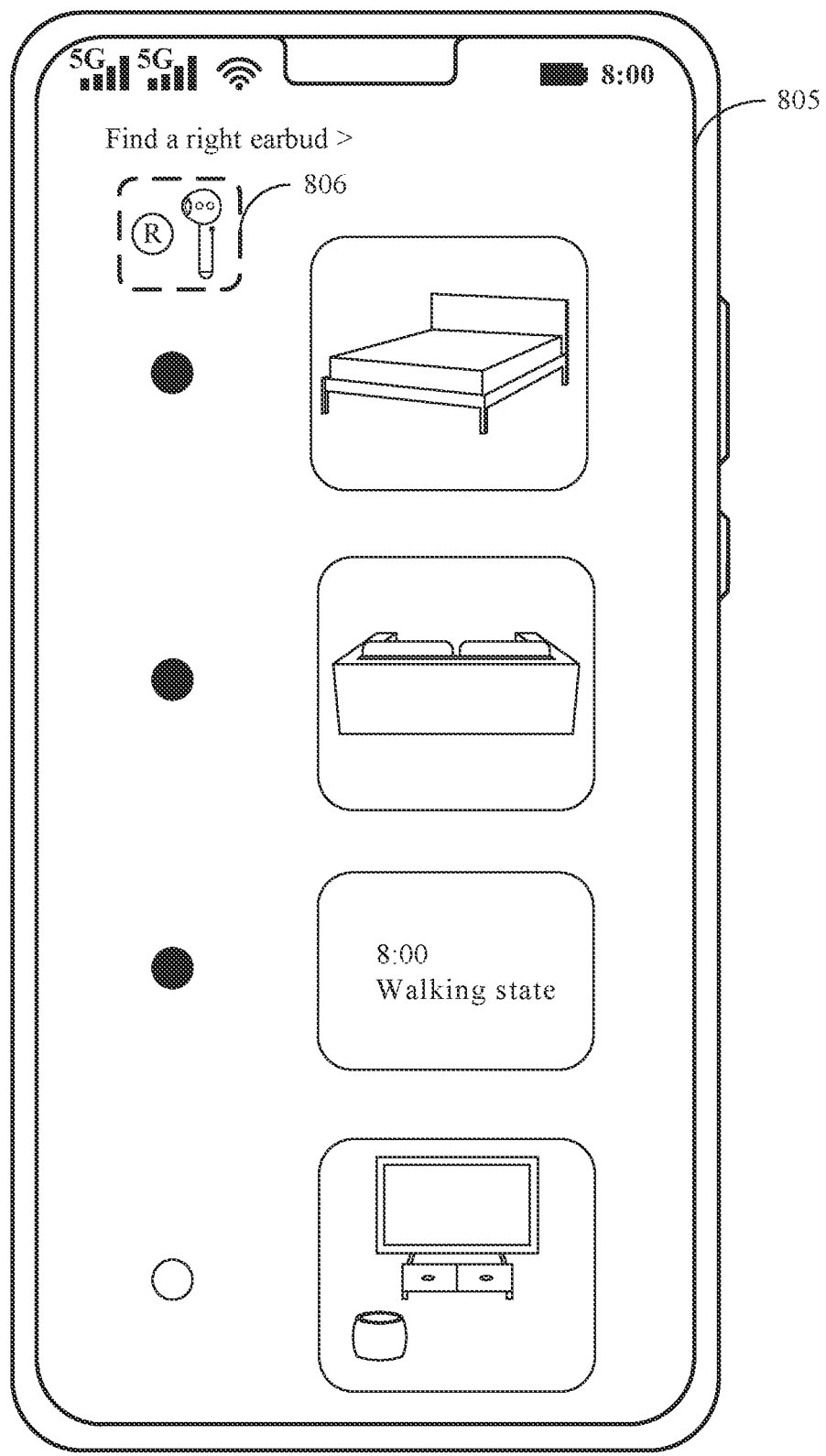

For example, in response to the user selection of the option 802 corresponding to the right earbud as shown in FIG. 19(*a*), the mobile phone may display an interface 805 (third interface) as shown in FIG. 19(*b*). The interface 805 may display scenarios and states corresponding to the right earbud 806.

It should be noted that either step 1708 or step 1709 may be performed, or step 1708 and step 1709 may be performed separately at different times. This is not limited in this application.

According to the method provided in the embodiment of this application, the wearing/taking-off state of the earphone (the left earbud or the right earbud) is associated with the geographical position or the life scenario and recorded, so that the user can better recall a position of the lost earphone, the user can conveniently retrieve the wearable device, and user experience is improved.

It should be noted that the electronic device in the embodiment in FIG. 17 may be the mobile phone in the foregoing embodiments. For a part not described in detail in the embodiment in FIG. 17, refer to the foregoing embodiments. Details are not described herein again.

Figure 20:
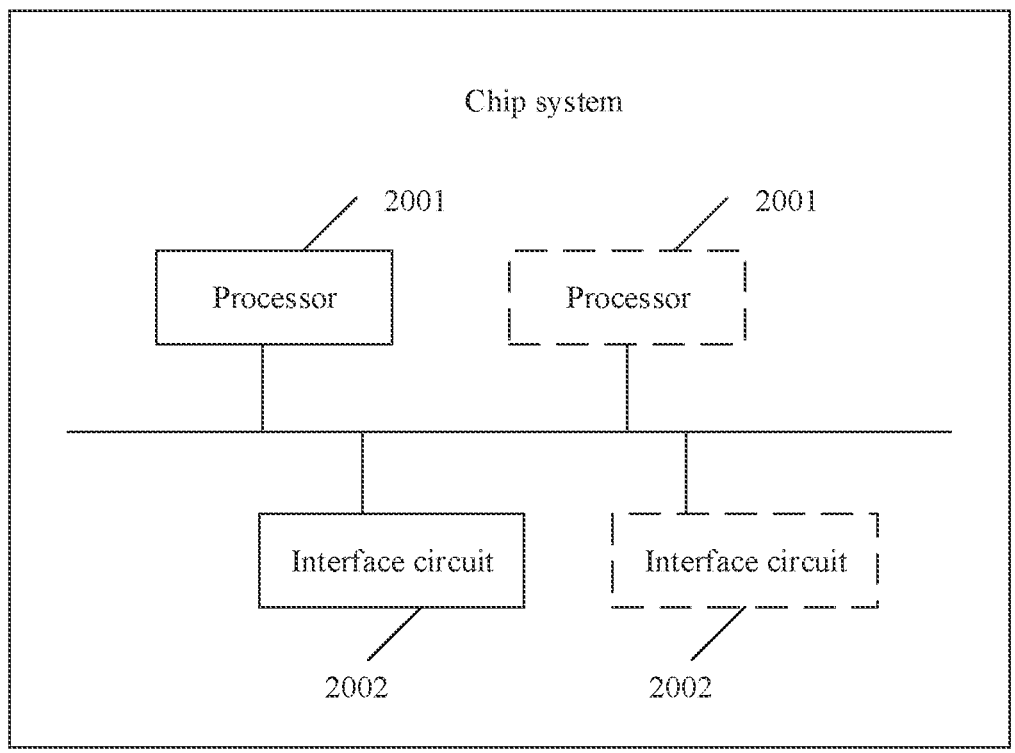
FIG. 20 is a schematic diagram of a structure of a chip system according to an embodiment of this application.

An embodiment of this application further provides a chip system. As shown in FIG. 20, the chip system includes at least one processor 2001 and at least one interface circuit 2002. The processor 2001 and the interface circuit 2002 may be interconnected by using a wire. For example, the interface circuit 2002 may be configured to receive a signal from another apparatus (for example, a memory of an electronic device). In another example, the interface circuit 2002 may be configured to transmit a signal to another apparatus (for example, the processor 2001).

For example, the interface circuit 2002 may read instructions stored in a memory of an electronic device, and send the instructions to the processor 2001. When the instructions are executed by the processor 2001, the electronic device (the electronic device 200 shown in FIG. 2) or a wearable device (the wearable device 300 shown in FIG. 3) may be enabled to perform the steps in the foregoing embodiments. Certainly, the chip system may further include other discrete devices. This is not specifically limited in the embodiments of this application.

An embodiment of this application further provides a computer-readable storage medium including computer instructions. When the computer instructions are run on an electronic device (the electronic device 200 as shown in FIG. 2) or a wearable device (the wearable device 300 as shown in FIG. 3), the electronic device 200 is enabled to perform the various functions or steps performed by the electronic device in the foregoing method embodiments, and the wearable device 300 is enabled to perform the various functions or steps performed by the wearable device in the foregoing method embodiments.

An embodiment of this application further provides a computer program product. When the computer program product is run on a computer, the computer is enabled to perform the various functions or steps performed by the electronic device in the foregoing method embodiments.

An embodiment of this application further provides a processing apparatus, which can be divided into different logical units or modules according to functions, and each unit or module performs a different function, so that the processing apparatus performs the various functions or steps performed by the electronic device or the wearable device in the foregoing method embodiments.

The foregoing descriptions about implementations allow a person skilled in the art to clearly understand that the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is only an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one physical unit or a plurality of physical units, that is, may be located in one place, or may be distributed in a plurality of different places. Some or all of the units may be selected based on actual needs to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A method for finding a wearable device, the method comprising:
   receiving, by an electronic device, a first event from the wearable device, wherein the first event comprises a wearing event or a taking-off event;
   determining, by the electronic device, that the electronic device is located in a preset residence area;
   based on the electronic device being located in the preset residence area, obtaining, by the electronic device, a first scenario in response to receiving the first event, wherein the first scenario corresponds to a first life event;
   determining, by the electronic device, an association relationship between the first event and the first scenario;
   receiving, by the electronic device, a usage state from the wearable device, wherein the usage state comprises a wearing state or a taken-off state;
   determining whether to switch from the first scenario to a second scenario based on determining that the usage state is a continuation of the first event, wherein the second scenario corresponds to a second life event, and wherein the first scenario is different from the second scenario;
   determining an association relationship between the first event and the second scenario based on determining to switch from the first scenario to the second scenario;
   displaying, by the electronic device, a first interface in response to a first user operation on a first application program, wherein the first interface comprises a first option for finding the wearable device; and
   displaying, by the electronic device, a second interface in response to a second user operation of selecting the first option, wherein the second interface comprises first information and second information that are corresponding to the wearable device, the first information is associated with the second information, the first information corresponds to the first scenario, and the second information corresponds to the first event.

2. The method according to claim 1, further comprising:
   displaying a visualization map in response to a third user operation on the first information, wherein the visualization map comprises an identity indicating a first position.

3. The method according to claim 1, wherein the obtaining the first scenario comprises:
   searching for the first scenario from a second application program, wherein the second application program comprises a plurality of scenarios, the first scenario is any one of the plurality of scenarios, and the plurality of scenarios comprise at least one of a sleep scenario, a get-up scenario, a cinema scenario, a dining scenario, a leisure scenario, a reading scenario, an entertainment scenario, a return home scenario, or a leave home scenario.

4. The method according to claim 1, further comprising:
   receiving a second event, wherein the first event is the wearing event and the second event is the taking-off event, or the first event is the taking-off event and the second event is the wearing event;
   obtaining a second position or a third scenario in response to receiving the second event, wherein the second position is used to indicate a geographical position of the electronic device or the wearable device, and the third scenario is used to indicate the home state of the user; and
   determining an association relationship between the second event and the second position or the third scenario.

5. The method according to claim 1, wherein the wearable device is a Bluetooth earphone comprising a left earbud and a right earbud, and wherein the second interface comprises first information and second information corresponding to the left earbud and first information and second information corresponding to the right earbud.

6. The method according to claim 1, wherein the wearing state is a continuation of the wearing event, and wherein the taken-off state is a continuation of the taking-off event.

7. A system, comprising:
   an electronic device; and
   a wearable device;
   wherein the wearable device is configured to send a first event to the electronic device based on the wearable device detecting the first event, wherein the first event comprises a wearing event or a taking-off event; and
   wherein the electronic device is configured to:
      receive the first event from the wearable device;
      determine that the electronic device is located in a preset residence area;
      based on the electronic device being located in the preset residence area, obtain a first scenario in response to receiving the first event, wherein the first scenario corresponds to a first life event;
      determine an association relationship between the first event and the first scenario;
      receive, by the electronic device, a usage state from the wearable device, wherein the usage state comprises a wearing state or a taken-off state;
      determine whether to switch from the first scenario to a second scenario based on determining that the usage state is a continuation of the first event, wherein the second scenario corresponds to a second life event, and wherein the first scenario is different from the second scenario;
      determine an association relationship between the first event and the second scenario based on determining to switch from the first scenario to the second scenario;
      display a first interface in response to a first user operation on a first application program, wherein the first interface comprises a first option for finding the wearable device; and
      display a second interface in response to a second user operation of selecting the first option, wherein the second interface comprises first information and second information that are corresponding to the wearable device, the first information is associated with the second information, the first information corresponds to the first scenario, and the second information corresponds to the first event.

8. The system according to claim 7, wherein the electronic device is further configured to:
   display a visualization map in response to a third user operation on the first information, wherein the visualization map comprises an identity indicating a first position.

9. The system according to claim 8, wherein the obtaining the first scenario comprises:
   searching for the first scenario from a second application program, wherein the second application program comprises a plurality of scenarios, the first scenario is any one of the plurality of scenarios, and the plurality of scenarios comprise at least one of a sleep scenario, a get-up scenario, a cinema scenario, a dining scenario, a leisure scenario, a reading scenario, an entertainment scenario, a return home scenario, or a leave home scenario.

10. The system according to claim 7, wherein the electronic device is further configured to:
receive a second event, wherein the first event is the wearing event and the second event is the taking-off event, or the first event is the taking-off event and the second event is the wearing event;
obtain a second position or a third scenario in response to receiving the second event, wherein the second position is used to indicate a geographical position of the electronic device or the wearable device, and the third scenario is used to indicate the home state of the user; and
determine an association relationship between the second event and the second position or the third scenario.

11. The system according to claim 7, wherein the wearable device is a Bluetooth earphone comprising a left earbud and a right earbud, and wherein the second interface comprises first information and second information corresponding to the left earbud and first information and second information corresponding to the right earbud.

12. An electronic device, comprising:
one or more processors; and
a memory coupled to the one or more processors, wherein the memory is configured to store computer program code, the computer program code comprises computer instructions, and when the computer instructions are executed by the one or more processors, the electronic device is enabled to perform operations comprising:
receiving a first event from a wearable device, wherein the first event comprises a wearing event or a taking-off event;
determining that the electronic device is located in a preset residence area;
based on the electronic device being located in the preset residence area, obtaining a first scenario in response to receiving the first event, wherein the first scenario corresponds to a first life event;
determining an association relationship between the first event and the first scenario;
receiving a usage state from the wearable device, wherein the usage state comprises a wearing state or a taken-off state;
determining whether to switch from the first scenario to a second scenario based on determining that the usage state is a continuation of the first event, wherein the second scenario corresponds to a second life event, and wherein the first scenario is different from the second scenario;
determining an association relationship between the first event and the second scenario based on determining to switch from the first scenario to the second scenario;
displaying a first interface in response to a first user operation on a first application program, wherein the first interface comprises a first option for finding the wearable device; and
displaying a second interface in response to a second user operation of selecting the first option, wherein the second interface comprises first information and second information that are corresponding to the wearable device, the first information is associated with the second information, the first information corresponds to the first scenario, and the second information corresponds to the first event.

13. The electronic device according to claim 12, wherein the operations further comprise:
displaying a visualization map in response to a third user operation on the first information, wherein the visualization map comprises an identity indicating a first position.

14. The electronic device according to claim 13, wherein the obtaining the first scenario comprises:
searching for the first scenario from a second application program, wherein the second application program comprises a plurality of scenarios, the first scenario is any one of the plurality of scenarios, and the plurality of scenarios comprise at least one of a sleep scenario, a get-up scenario, a cinema scenario, a dining scenario, a leisure scenario, a reading scenario, an entertainment scenario, a return home scenario, or a leave home scenario.

15. The electronic device according to claim 12, wherein the operations further comprise:
receiving a second event, wherein the first event is the wearing event and the second event is the taking-off event, or the first event is the taking-off event and the second event is the wearing event;
obtaining a second position or a third scenario in response to receiving the second event, wherein the second position is used to indicate a geographical position of the electronic device or the wearable device, and the third scenario is used to indicate the home state of the user; and
determining an association relationship between the second event and the second position or the third scenario.

16. The electronic device according to claim 12, wherein the wearable device is a Bluetooth earphone comprising a left earbud and a right earbud, and wherein the second interface comprises first information and second information corresponding to the left earbud and first information and second information corresponding to the right earbud.

* * * * *